United States Patent
Fukushima et al.

(10) Patent No.: US 11,496,614 B2
(45) Date of Patent: Nov. 8, 2022

(54) HANDS-FREE APPARATUS, METHOD OF DATA TRANSFER, AND COMPUTER-READABLE MEDIUM

(71) Applicant: Panasonic Intellectual Property Management Co., Ltd., Osaka (JP)

(72) Inventors: Hideyo Fukushima, Kanagawa Ken (JP); Masayoshi Ohtani, Kanagawa Ken (JP); Taichi Nakamura, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/197,922

(22) Filed: Mar. 10, 2021

(65) Prior Publication Data
US 2021/0297513 A1 Sep. 23, 2021

(30) Foreign Application Priority Data
Mar. 23, 2020 (JP) .............................. JP2020-051858

(51) Int. Cl.
*H04M 1/00* (2006.01)
*H04M 1/60* (2006.01)
*H04M 1/57* (2006.01)

(52) U.S. Cl.
CPC ........... *H04M 1/006* (2013.01); *H04M 1/575* (2013.01); *H04M 1/6075* (2013.01); *H04M 2203/551* (2013.01); *H04M 2250/60* (2013.01)

(58) Field of Classification Search
CPC .... H04M 1/006; H04M 1/575; H04M 1/6075; H04M 2203/551; H04M 2250/60;
(Continued)

(56) References Cited

U.S. PATENT DOCUMENTS 8,055,406 B2  11/2011  Murakami
2009/0265100 A1  10/2009  Murakami
(Continued)

FOREIGN PATENT DOCUMENTS

EP  2184907 A1 *  5/2010  ...... H04M 1/274516
JP  2002-193046  7/2002
(Continued)

OTHER PUBLICATIONS

La Polla, Mariantonietta, Fabio Martinelli, and Daniele Sgandurra. "A survey on security for mobile devices." IEEE communications surveys & tutorials 15.1 (2012): 446-471. (Year: 2012).*
(Continued)

*Primary Examiner* — Sharad Rampuria
(74) *Attorney, Agent, or Firm* — Greenblum & Bernstein, P.L.C.

(57) ABSTRACT

A hands-free apparatus includes a memory and a hardware processor coupled to the memory. The hardware processor is configured to: connect to a mobile phone to enable a hands-free telephone conversation; receive at least one data of outgoing call history data, incoming call history data, missed call history data, and phonebook data stored in the mobile phone; and execute synchronization permission checking processing to check whether transfer of the at least one data is permitted in the mobile phone before receiving the at least one data from the mobile phone.

15 Claims, 21 Drawing Sheets

(58) Field of Classification Search
CPC .......... H04M 1/2757; H04M 2250/02; H04M 1/6091; H04M 3/54; H04M 2203/1091; H04M 2207/18; H04M 1/6083; H04W 4/16; B60R 11/0241
See application file for complete search history.

(56) References Cited

U.S. PATENT DOCUMENTS

| | | | |
|---|---|---|---|
| 2010/0248694 A1* | 9/2010 | Suzuki | H04L 51/42 455/413 |
| 2014/0359139 A1* | 12/2014 | Efrati | H04L 45/3065 709/227 |
| 2016/0378410 A1 | 12/2016 | Inoue | |

FOREIGN PATENT DOCUMENTS

| | | |
|---|---|---|
| JP | 2009-267535 | 11/2009 |
| JP | 2017-010329 | 1/2017 |
| JP | 6094692 | 3/2017 |
| JP | 2019-110612 | 7/2019 |

OTHER PUBLICATIONS

Oka, Dennis Kengo, et al. "Survey of vehicle IoT bluetooth devices." 2014 IEEE 7th international conference on service-oriented computing and applications. IEEE, 2014. (Year: 2014).*

* cited by examiner

FIG.2
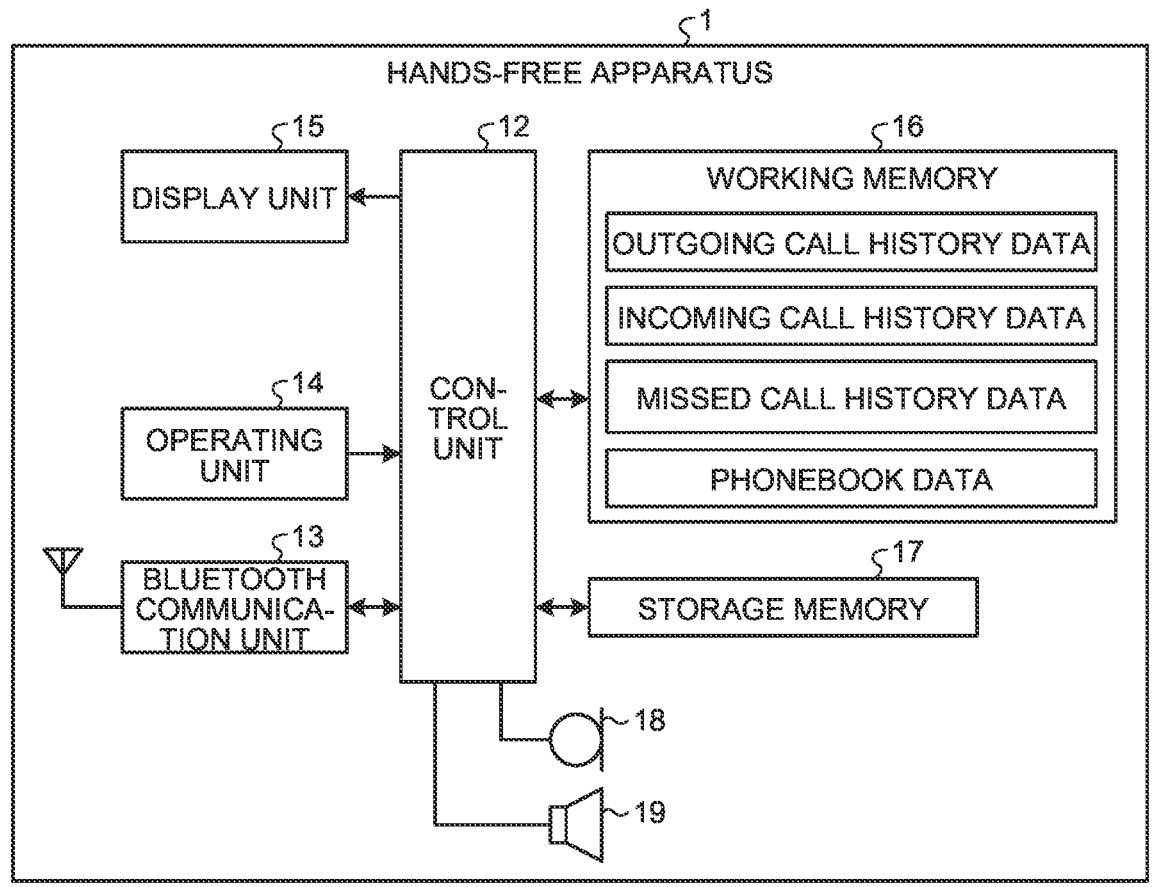
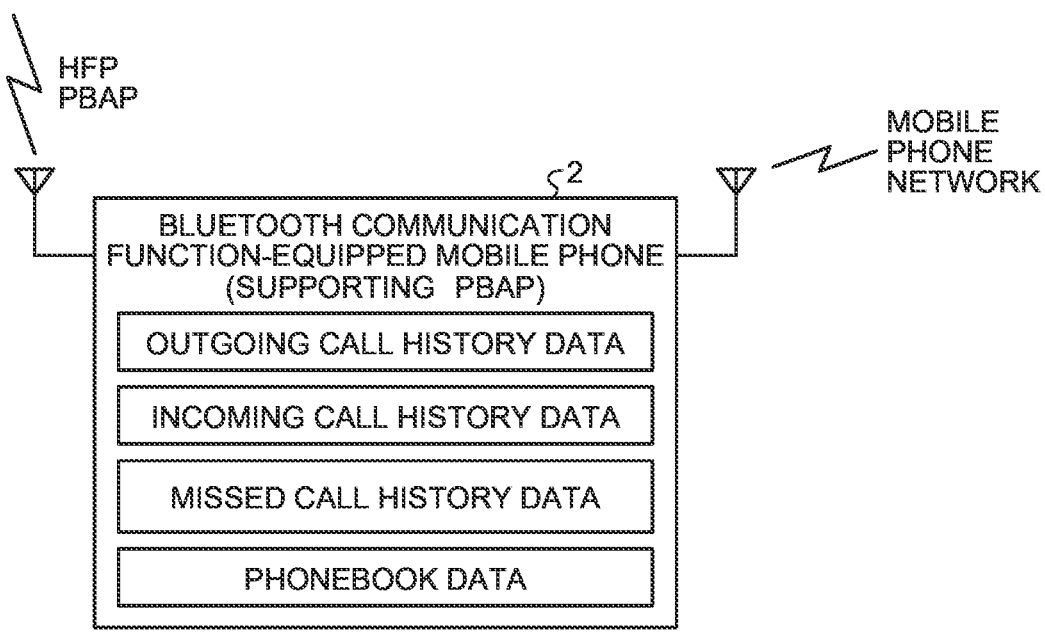

FIG.7A

| OUTGOING CALL HISTORY DATA | | |
|---|---|---|
| TARO ABE | 090×××××××× | AUGUST 10 12:15 |
| HANAKO SATO | 090×××××××× | AUGUST 10 12:00 |
| TARO ABE | 090×××××××× | AUGUST 10 11:20 |
| KAZUO TANAKA | 090×××××××× | AUGUST 10 11:10 |
| KAZUO TANAKA | 090×××××××× | AUGUST 10 10:50 |
| JIRO NOMURA | 090×××××××× | AUGUST 10 10:15 |

FIG.7B

| PHONEBOOK DATA | |
|---|---|
| ICHIRO KATO | 090×××××××× |
| GORO OKADA | 090×××××××× |
| SHIRO MORI | 090×××××××× |
| JIRO YAMADA | 090×××××××× |
| ICHIRO YOSHIMOTO | 090×××××××× |
| SABURO WATANABE | 090×××××××× |
| … | 090×××××××× |

FIG.7C

| OUTGOING CALL HISTORY DATA | | |
|---|---|---|
| ICHIRO KATO | 090×××××××× | AUGUST 10 13:40 |
| TARO ABE | 090×××××××× | AUGUST 10 12:15 |
| HANAKO SATO | 090×××××××× | AUGUST 10 12:00 |
| TARO ABE | 090×××××××× | AUGUST 10 11:20 |
| KAZUO TANAKA | 090×××××××× | AUGUST 10 11:10 |
| KAZUO TANAKA | 090×××××××× | AUGUST 10 10:50 |

← REGISTERED NAMES OF PHONEBOOK DATA ARE DISPLAYED

FIG.8A

| INCOMING CALL HISTORY DATA | | |
|---|---|---|
| ICHIRO KATO | 090×××××××× | AUGUST 10 13:00 |
| AIKO HAYASHI | 090×××××××× | AUGUST 10 12:25 |
| ROKURO MORI | 090×××××××× | AUGUST 10 11:45 |
| ICHIRO KATO | 090×××××××× | AUGUST 10 11:15 |
| SHICHIRO YAMADA | 090×××××××× | AUGUST 10 11:10 |
| HACHIRO UEDA | 090×××××××× | AUGUST 10 10:20 |

FIG.8B

| PHONEBOOK DATA | |
|---|---|
| ICHIRO KATO | 090×××××××× |
| GORO OKADA | 090×××××××× |
| SHIRO MORI | 090×××××××× |
| JIRO YAMADA | 090×××××××× |
| ICHIRO YOSHIMOTO | 090×××××××× |
| SABURO WATANABE | 090×××××××× |
| ... | 090×××××××× |

FIG.8C

| INCOMING CALL HISTORY DATA | | |
|---|---|---|
| ICHIRO YOSHIMOTO | 090×××××××× | AUGUST 10 13:25 |
| ICHIRO KATO | 090×××××××× | AUGUST 10 13:00 |
| AIKO HAYASHI | 090×××××××× | AUGUST 10 12:25 |
| ROKURO MORI | 090×××××××× | AUGUST 10 11:45 |
| ICHIRO KATO | 090×××××××× | AUGUST 10 11:15 |
| SHICHIRO YAMADA | 090×××××××× | AUGUST 10 11:10 |

← REGISTERED NAMES OF PHONEBOOK DATA ARE DISPLAYED

FIG.9A

| MISSED CALL HISTORY DATA | | |
|---|---|---|
| TARO MURAKAMI | 090×××××××× | AUGUST 10 12:28 |
| HANAKO SAITO | 090×××××××× | AUGUST 10 12:24 |
| HANAKO UEDA | 090×××××××× | AUGUST 10 12:06 |
| JIRO OBAYASHI | 090×××××××× | AUGUST 10 11:04 |
| HANAKO SAITO | 090×××××××× | AUGUST 10 10:54 |
| KAZUO OMURA | 090×××××××× | AUGUST 10 10:24 |

FIG.9B

| PHONEBOOK DATA | |
|---|---|
| ICHIRO KATO | 090×××××××× |
| GORO OKADA | 090×××××××× |
| SHIRO MORI | 090×××××××× |
| JIRO YAMADA | 090×××××××× |
| ICHIRO YOSHIMOTO | 090×××××××× |
| SABURO WATANABE | 090×××××××× |
| ... | 090×××××××× |

FIG.9C

| MISSED CALL HISTORY DATA | | |
|---|---|---|
| SABURO WATANABE | 090×××××××× | AUGUST 10 12:46 |
| TARO MURAKAMI | 090×××××××× | AUGUST 10 12:28 |
| HANAKO SAITO | 090×××××××× | AUGUST 10 12:24 |
| HANAKO UEDA | 090×××××××× | AUGUST 10 12:06 |
| JIRO OBAYASHI | 090×××××××× | AUGUST 10 11:04 |
| HANAKO SAITO | 090×××××××× | AUGUST 10 10:54 |

← REGISTERED NAMES OF PHONEBOOK DATA ARE DISPLAYED

FIG.10

| OUTGOING CALL HISTORY DATA | | |
|---|---|---|
| TARO ABE | 090xxxxxxxx | AUGUST 10 12:15 |
| HANAKO SATO | 090xxxxxxxx | AUGUST 10 12:00 |
| TARO ABE | 090xxxxxxxx | AUGUST 10 11:20 |
| KAZUO TANAKA | 090xxxxxxxx | AUGUST 10 11:10 |
| KAZUO TANAKA | 090xxxxxxxx | AUGUST 10 10:50 |
| JIRO NOMURA | 090xxxxxxxx | AUGUST 10 10:15 |

| INCOMING CALL HISTORY DATA | | |
|---|---|---|
| ICHIRO KATO | 090xxxxxxxx | AUGUST 10 13:00 |
| AIKO HAYASHI | 090xxxxxxxx | AUGUST 10 12:25 |
| ROKURO MORI | 090xxxxxxxx | AUGUST 10 11:45 |
| ICHIRO KATO | 090xxxxxxxx | AUGUST 10 11:15 |
| SHICHIRO YAMADA | 090xxxxxxxx | AUGUST 10 11:10 |
| HACHIRO UEDA | 090xxxxxxxx | AUGUST 10 10:20 |

| MISSED CALL HISTORY DATA | | |
|---|---|---|
| TARO MURAKAMI | 090xxxxxxxx | AUGUST 10 12:28 |
| HANAKO SAITO | 090xxxxxxxx | AUGUST 10 12:24 |
| HANAKO UEDA | 090xxxxxxxx | AUGUST 10 12:06 |
| JIRO OBAYASHI | 090xxxxxxxx | AUGUST 10 11:04 |
| HANAKO SAITO | 090xxxxxxxx | AUGUST 10 10:54 |
| KAZUO OMURA | 090xxxxxxxx | AUGUST 10 10:24 |

| ALL HISTORY DATA | | |
|---|---|---|
| ICHIRO KATO | 090xxxxxxxx | AUGUST 10 13:00 |
| TARO MURAKAMI | 090xxxxxxxx | AUGUST 10 12:28 |
| AIKO HAYASHI | 090xxxxxxxx | AUGUST 10 12:25 |
| HANAKO SAITO | 090xxxxxxxx | AUGUST 10 12:24 |
| TARO ABE | 090xxxxxxxx | AUGUST 10 12:15 |
| HANAKO UEDA | 090xxxxxxxx | AUGUST 10 12:06 |
| HANAKO SATO | 090xxxxxxxx | AUGUST 10 12:00 |
| ROKURO MORI | 090xxxxxxxx | AUGUST 10 11:45 |
| ICHIRO KATO | 090xxxxxxxx | AUGUST 10 11:15 |
| SHICHIRO YAMADA | 090xxxxxxxx | AUGUST 10 11:10 |

OUTGOING CALL HISTORY DATA WITH DUPLICATED TELEPHONE NUMBER IS NOT DISPLAYED (a)

| OUTGOING CALL TELEPHONE NUMBER | OUTGOING CALL DATE AND TIME |
|---|---|
| 09000000005 | MAY 10 17:25 |
| 09000000004 | MAY 10 17:14 |
| 09000000003 | MAY 10 17:12 |
| 09000000002 | MAY 10 17:08 |
| 09000000001 | MAY 10 17:01 |

} OUTGOING CALL HISTORY DATA AUTOMATICALLY TRANSFERRED FROM MOBILE PHONE (b)

| OUTGOING CALL TELEPHONE NUMBER | OUTGOING CALL DATE AND TIME |
|---|---|
| 09000000100 | MAY 10 17:32 |
| 09000000005 | MAY 10 17:25 |
| 09000000004 | MAY 10 17:14 |
| 09000000003 | MAY 10 17:12 |
| 09000000002 | MAY 10 17:08 |

OUTGOING CALL HISTORY DATA OF HANDS-FREE APPARATUS

OUTGOING CALL HISTORY DATA AUTOMATICALLY TRANSFERRED FROM MOBILE PHONE (a)

| INCOMING CALL TELEPHONE NUMBER | INCOMING CALL DATE AND TIME |
|---|---|
| 09000000010 | MAY 10 17:45 |
| 09000000009 | MAY 10 17:20 |
| 09000000008 | MAY 10 16:59 |
| 09000000007 | MAY 10 16:52 |
| 09000000006 | MAY 10 16:50 |

} INCOMING CALL HISTORY DATA AUTOMATICALLY TRANSFERRED FROM MOBILE PHONE (b)

| INCOMING CALL TELEPHONE NUMBER | INCOMING CALL DATE AND TIME |
|---|---|
| 09000000200 | MAY 10 17:50 |
| 09000000010 | MAY 10 17:45 |
| 09000000009 | MAY 10 17:20 |
| 09000000008 | MAY 10 16:59 |
| 09000000007 | MAY 10 16:52 |

} INCOMING CALL HISTORY DATA OF HANDS-FREE APPARATUS

} INCOMING CALL HISTORY DATA AUTOMATICALLY TRANSFERRED FROM MOBILE PHONE

FIG.15 (a)
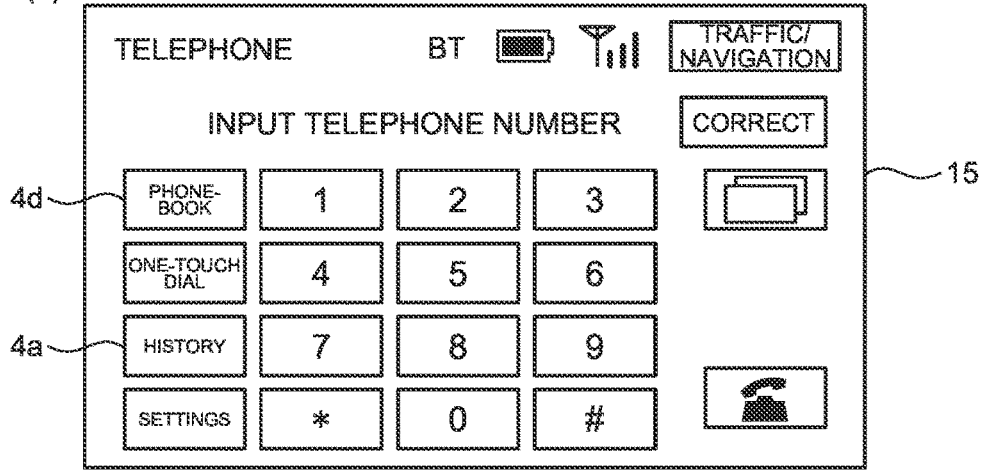
(b)
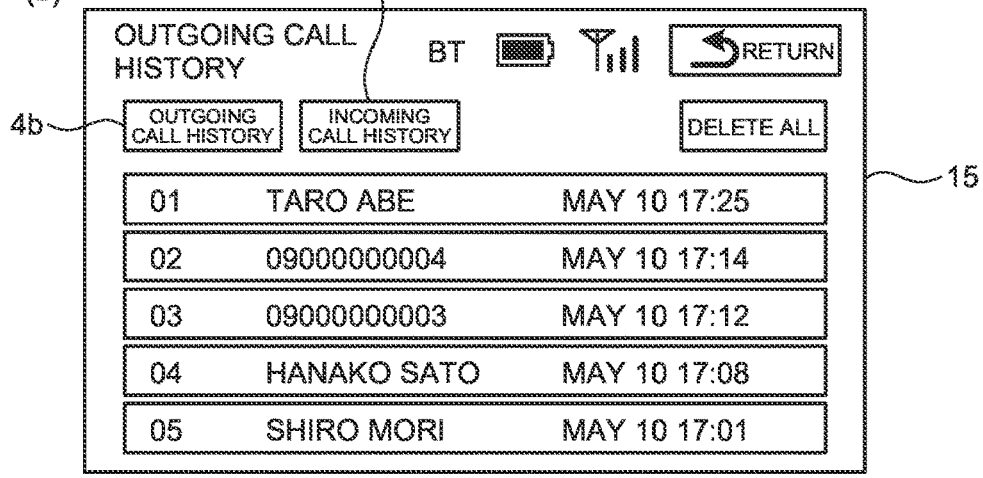
(c)
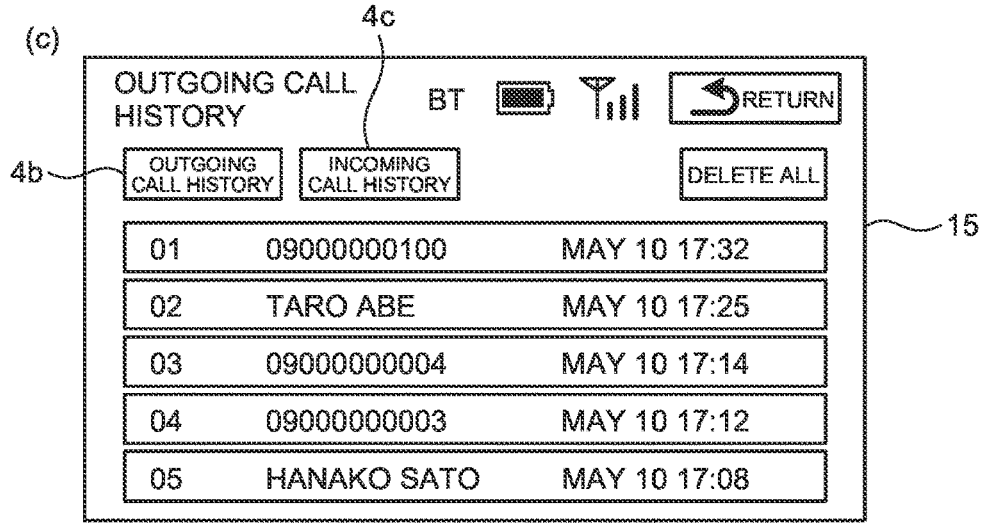

FIG. 16
(a)
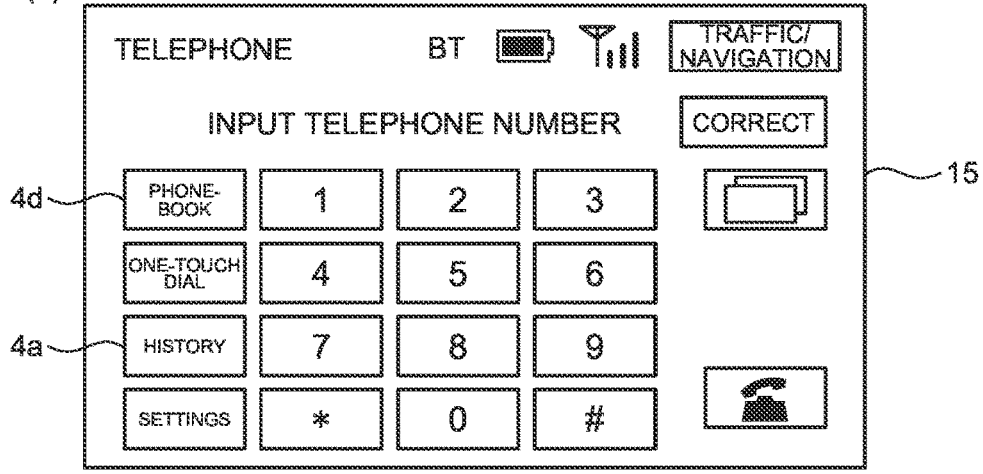
(b)
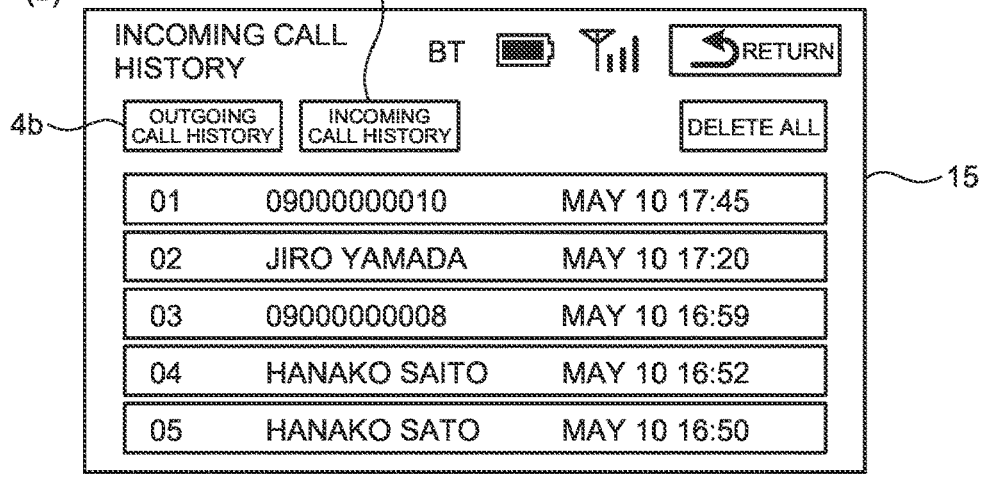
(c)
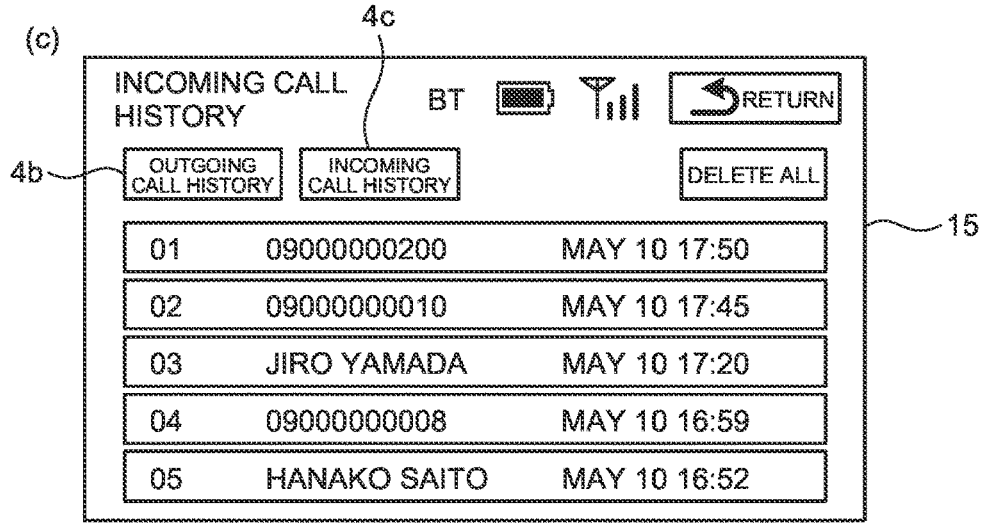

FIG.17
(a)
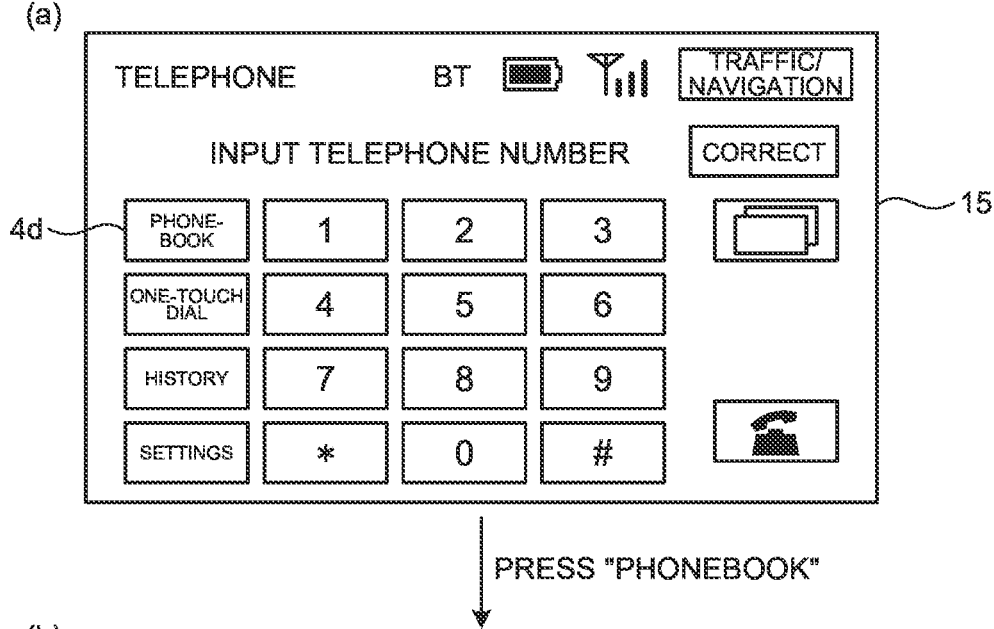
↓ PRESS "PHONEBOOK"
(b)
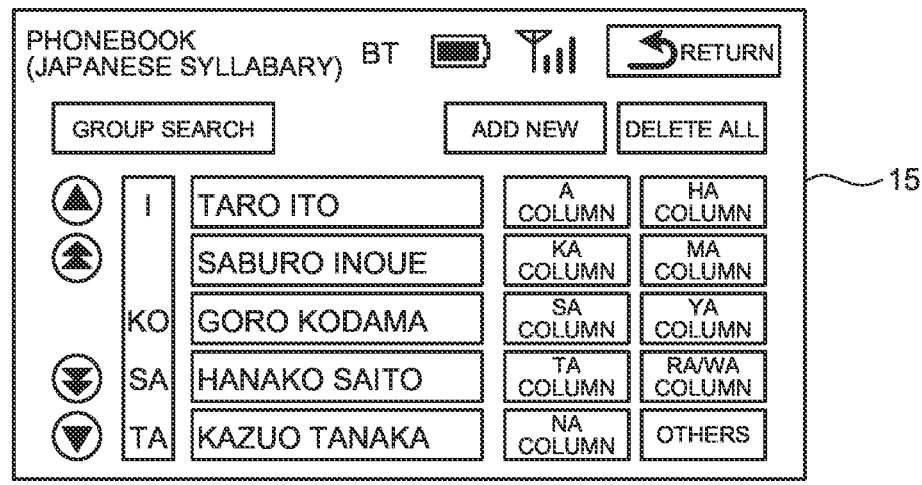

FIG.18

| TELEPHONE NUMBER | REGISTERED NAME |
|---|---|
| 09000000001 | KAZUO TANAKA |
| 09000000002 | TARO ITO |
| 09000000005 | TARO ABE |
| 09000000006 | SHIRO MORI |
| 09000000007 | GORO KODAMA |
| 09000000009 | HANAKO SAITO |
| ⋮ | ⋮ |

FIG.20
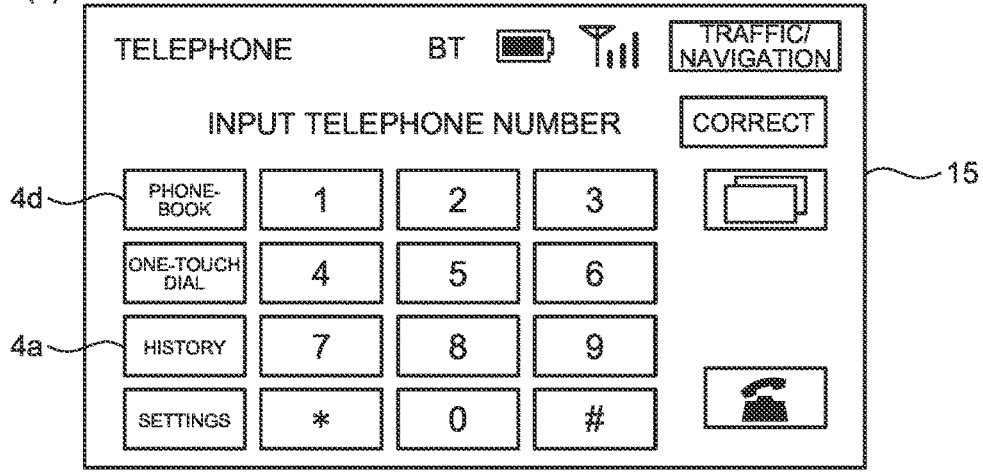
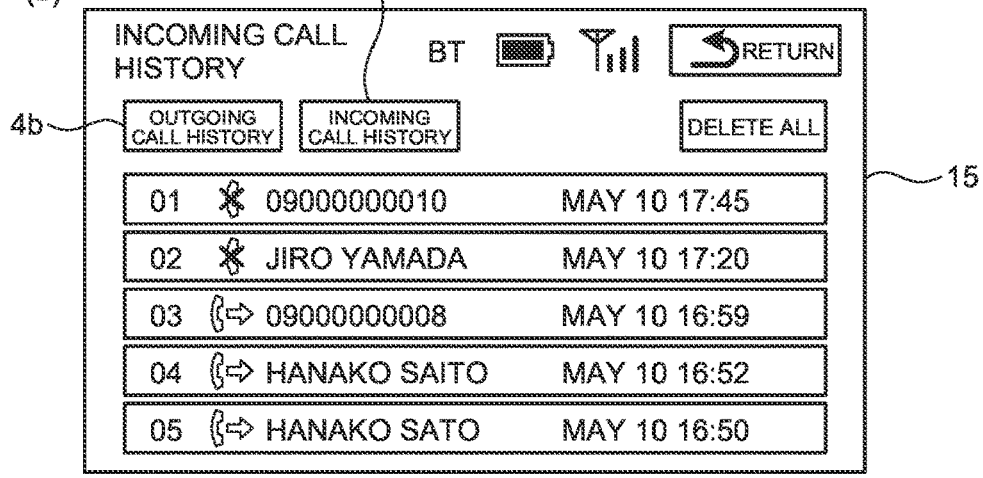
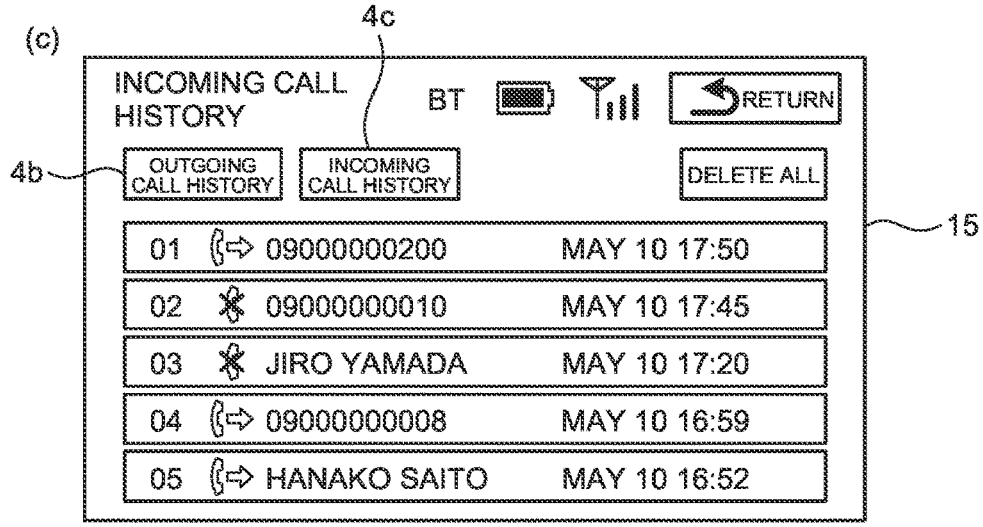

HANDS-FREE APPARATUS, METHOD OF DATA TRANSFER, AND COMPUTER-READABLE MEDIUM

CROSS-REFERENCE TO RELATED APPLICATIONS

This application is based upon and claims the benefit of priority from Japanese Patent Application No. 2020-051858, filed on Mar. 23, 2020, the entire contents of which are incorporated herein by reference.

FIELD

The present disclosure relates to a hands-free apparatus, a method of data transfer, and a computer-readable medium.

BACKGROUND

Hands-free apparatuses that establish a communication line with a mobile phone and can thereby receive an incoming call and make an outgoing call even without a user having to directly operate the mobile phone have conventionally been known. Such a hands-free apparatus is installed in a vehicle, for example, and is used when the user holds a telephone conversation while driving.

In addition, technologies that transfer phonebook data and outgoing/incoming call history data from the mobile phone to the hands-free apparatus are known. A conventional technique is described in Japanese Patent Application Laid-open No. 2002-193046.

However, in the conventional technologies, when the phonebook data and the outgoing/incoming call history data cannot be transferred to the hands-free apparatus based on a setting of the mobile phone, it may be difficult for the user to grasp the reason why these data cannot be transferred.

The present disclosure provides a hands-free apparatus, a method of data transfer, and a computer-readable medium that enable an appropriate action according to a data synchronization state between the hands-free apparatus and the mobile phone.

SUMMARY

A hands-free apparatus according to the present disclosure includes a memory and a hardware processor coupled to the memory. The hardware processor is configured to: connect to a mobile phone to enable a hands-free telephone conversation; receive at least one data of outgoing call history data, incoming call history data, missed call history data, and phonebook data stored in the mobile phone; and execute synchronization permission checking processing to check whether transfer of the at least one data is permitted in the mobile phone before receiving the at least one data from the mobile phone.

BRIEF DESCRIPTION OF THE DRAWINGS

FIG. 2 is a diagram of an exemplary hardware configuration of the hands-free apparatus according to the first embodiment;

FIGS. 7A to 7C are diagrams of an exemplary correspondence relation between outgoing call history data and phonebook data according to the first embodiment;

FIGS. 8A to 8C are diagrams of an exemplary correspondence relation between incoming call history data and the phonebook data according to the first embodiment;

FIGS. 9A to 9C are diagrams of an exemplary correspondence relation between missed call history data and the phonebook data according to the first embodiment;

FIG. 10 is a diagram of exemplary outgoing call history data, incoming call history data, missed call history data, and all history data according to the first embodiment;

FIG. 15 is a diagram of an exemplary transition of display screens when a user performs an outgoing call operation from an outgoing call history according to the first embodiment;

FIG. 16 is a diagram of an exemplary transition of display screens when the user performs an outgoing call operation from an incoming call history according to the first embodiment;

FIG. 17 is a diagram of an exemplary transition of display screens when the user performs an outgoing call operation from a phonebook according to the first embodiment;

FIG. 18 is a diagram of exemplary phonebook data according to the first embodiment;

FIG. 20 is a diagram of another exemplary transition of display screens when the user performs an outgoing call operation from the incoming call history according to the first embodiment.

DETAILED DESCRIPTION

The following describes embodiments of a hands-free apparatus, a method of data transfer, and a computer-readable medium according to the present disclosure with reference to the accompanying drawings.

First Embodiment

Figure 1:
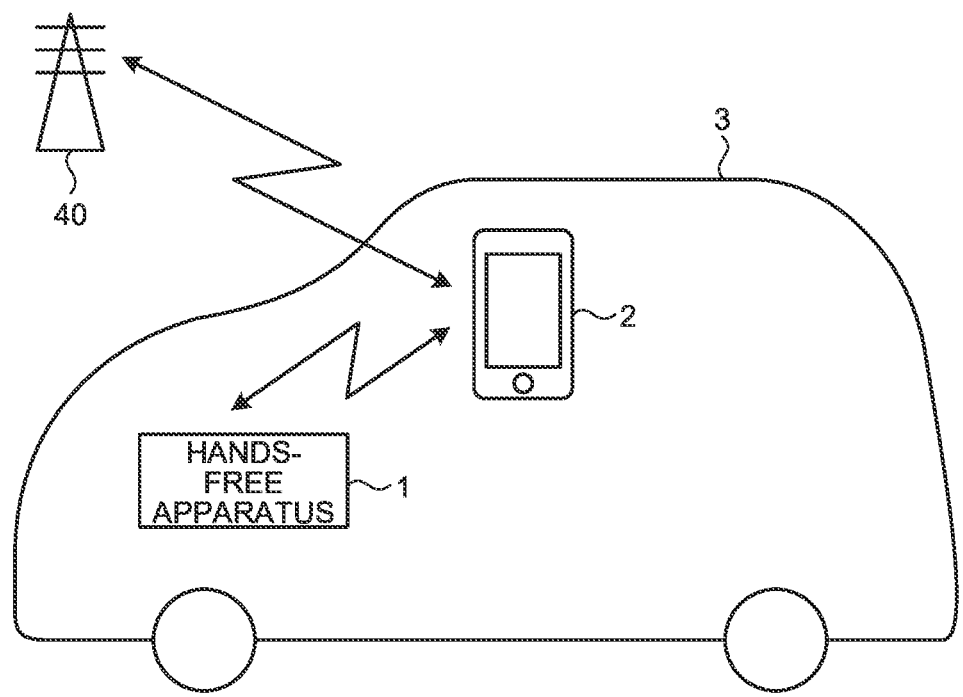
FIG. 1 is a diagram of an exemplary use mode of a hands-free apparatus according to a first embodiment.

FIG. 1 is a diagram of an exemplary use mode of a hands-free apparatus 1 according to the present embodiment. As illustrated in FIG. 1, the hands-free apparatus 1 of the present embodiment can be installed in a vehicle 3. The hands-free apparatus 1 is communicably connected with a mobile phone 2. The mobile phone 2 wirelessly communicates with a base station 40 via a mobile phone network. The mobile phone 2 is a smartphone, for example, and has a communication function based on the Bluetooth (registered trademark) system as near-field wireless communication means. The mobile phone 2 may be a mobile phone of a type other than the smartphone so long as it has a communication function based on the Bluetooth system.

The hands-free apparatus 1 connects to the mobile phone network via the mobile phone 2. Thus, a driver of the vehicle 3, for example, can make an outgoing call and receive an incoming call by operating the hands-free apparatus 1 even without operating the mobile phone 2. The hands-free apparatus 1 may be implemented as one function of an on-vehicle navigation apparatus installed in the vehicle 3, for example.

FIG. 2 is a diagram of an exemplary hardware configuration of the hands-free apparatus 1 according to the present embodiment. The hands-free apparatus 1 according to the present embodiment is a hands-free function-equipped on-vehicle navigation apparatus, for example. The hands-free apparatus 1 includes a control unit 12, a Bluetooth communication unit 13, an operating unit 14, a display unit 15, a working memory 16, a storage memory 17, a microphone 18, and a speaker 19.

The control unit 12 controls the entire operation such as communication operation and data management operation of the hands-free apparatus 1. The control unit 12 is a processor such as a central processing unit (CPU), for example.

The Bluetooth communication unit 13 supports the Bluetooth system as a near-field wireless communication means and establishes a wireless communication line with the mobile phone 2 present within a Bluetooth wireless communication range to perform communication pursuant to Bluetooth communication standards. In this case, it is assumed that the mobile phone 2 has a Bluetooth communication function and is present within the Bluetooth wireless communication range of the hands-free apparatus 1.

The Bluetooth communication unit 13 in the present embodiment supports known Hands Free Profile (HFP) for holding a hands-free telephone conversation and Phone Book Access Profile (PBAP) for performing transfer of phonebook data and transfer of outgoing/incoming call history data. These profiles mean communication protocols defined for respective functions.

As is known, the mobile phone 2, on its own (in a state not connecting HFP with the hands-free apparatus 1 as a hands-free device), establishes a mobile phone line with the base station 40 of the mobile phone network and can perform outgoing call processing and incoming call processing on its own. In this case, as the outgoing call processing, when a user operates dial keys ("0" to "9" numeric keys) (not illustrated) to input a telephone number of an outgoing call destination and then operates an outgoing call key (not illustrated), for example, the mobile phone 2 can make an outgoing call with the telephone number as the outgoing call destination and hold a telephone conversation with a mobile phone of the outgoing call destination.

As the incoming call processing, upon reception of an incoming call signal from the base station 40 in accordance with the fact that a mobile phone of an outgoing call source has made an outgoing call with the mobile phone 2 as an outgoing call destination, the mobile phone 2 receives the telephone number of the mobile phone of the outgoing call source as an incoming call telephone number from the base station 40 and, when the user operates an incoming call key (not illustrated), can respond to the mobile phone of the outgoing call source and can hold a telephone conversation with the mobile phone of the outgoing call source.

The mobile phone 2 has a timepiece unit (not illustrated) measuring a date and time and stores therein, with correspondence between an outgoing telephone number input from the dial keys in the outgoing call processing described above and an outgoing call date and time based on the date and time measured by the timepiece unit as one data, a plurality of outgoing call history data. The mobile phone 2 stores therein, with correspondence between an incoming call telephone number received from the base station 40 in the incoming call processing described above and an incoming call date and time based on the date and time measured by the timepiece unit as one data, a plurality of incoming call history data.

The mobile phone 2 stores therein, with correspondence between an incoming call telephone number received from the base 40 when making no response to an incoming call and an incoming call date and time based on the date and time measured by the timepiece unit as one data, a plurality of missed call history data. Further, the mobile phone 2 holds, with correspondence between a telephone number and a registered name as one data, a plurality of phonebook data. The phonebook data, to which the user inputs telephone numbers and registered names, stores about 500 telephone numbers and registered names, for example, in association with each other in a non-volatile memory (not illustrated).

When the mobile phone 2 has the phonebook data, the outgoing call history data and the incoming call history data include the registered names. Specifically, the incoming call telephone number received from the base station 40 is a telephone number registered in the phonebook data, and the mobile phone 2 checks whether a registered name is registered for this telephone number in the phonebook data; if it is present, the incoming call history data includes the telephone number, the incoming date and time, and the registered name. The missed call history data also includes the telephone number, the incoming date and time, and the registered name through similar processing. Also for the outgoing call history data, the mobile phone 2 checks whether the telephone number with which the outgoing call has been made in the outgoing call processing is a telephone number registered in the phonebook data. When the telephone number is registered in the phonebook data, the outgoing call history data includes the outgoing call date and time, the outgoing call telephone number, and the registered name.

The user selects one telephone number read from the phonebook data by the mobile phone 2 and makes an outgoing call and can thereby make an outgoing call by a simple operation without errors even without having to input all numeric keys corresponding to the numbers forming the telephone number one by one. The mobile phone 2 can store therein the latest 20 pieces each of the outgoing call history data, the incoming call history data, and the missed call history data, for example, and automatically deletes the oldest data each time the outgoing call processing, the incoming call processing, or a missed call is performed to update the outgoing call history data, the incoming call history data, and the missed call history data. The mobile phone 2 supports known HFP for holding a hands-free telephone conversation and PBAP for performing the transfer of the phonebook data and the transfer of the outgoing/incoming call history data.

The mobile phone 2, when supporting PBAP prescribing automatic transfer of the outgoing/incoming call history data, connects PBAP immediately after the communication line is established with the Bluetooth communication unit 13, automatically transfer the phonebook data stored at the point in time, and further automatically transfer the outgoing call history data, the incoming call history data, and the missed call history data stored at the point in time. Thus, when the hands-free apparatus 1 is present within the Bluetooth communication range, the mobile phone 2 automatically transfers a maximum of 20 outgoing call history data stored by performing the outgoing call processing in the past on its own, a maximum of 20 incoming call history data stored by performing the incoming call processing in the past on its own, and a maximum of 20 missed call history data stored by performing missed call processing in the past on its own to the hands-free apparatus 1.

In the present embodiment, when the outgoing call history data, the incoming call history data, and the missed call history data are collectively referred to, they are referred to simply as history data.

The operating unit 14 of the hands-free apparatus 1 is an operating means referred to in the present embodiment for the user to operate, includes touch keys formed in the display unit 15, for example, detects an operation by the user, and outputs an operating signal representing its operation details to the control unit 12. The display unit 15 is a display means referred to in the present embodiment, and upon input of a display signal from the control unit 12, displays a display screen based on the input display signal, and displays a display screen on which dial keys corresponding to "0" to "9" are arranged as a display screen for the user to input a telephone number, for example. The display unit 15 is a liquid crystal display or an electro luminescence (EL) display, for example, but is not limited thereto.

The working memory 16 is an outgoing call history data storage means, an incoming call history data storage means, and a data storage means referred to in the present embodiment and includes a volatile memory. The working memory 16 stores therein the outgoing call history data, the incoming call history data, the missed call history data, and the phonebook data automatically transferred from the mobile phone 2 without involving any user operation. In this case, the working memory 16 can store therein five pieces each of the outgoing call history data, the incoming call history data, and the missed call history data, for example. The working memory 16 is a random access memory (RAM), for example.

The storage memory 17 includes a non-volatile memory and stores therein various kinds of data. The storage memory 17 is a read only memory (ROM), for example. The storage memory 17 may be a writable storage medium such as a hard disk drive (HDD) or a flash memory.

The control unit 12 causes the display unit 15 to display the outgoing call history data stored in the working memory 16 when the user makes a request to display the outgoing call history data with the operating unit 14, causes the display unit 15 to display the incoming call history data stored in the working memory 16 when the user makes a request to display the incoming call history data with operating unit 14, and causes the display unit 15 to display the phonebook data stored in the working memory 16 when the user makes a request to display the phonebook data with the operating unit 14. As described above, the hands-free apparatus 1 of the present embodiment has five pieces each of the outgoing call history data and the incoming call history data stored in the working memory 16 and has five pieces each of them at the maximum displayed on the display unit 15. The number of these data stored in the working memory 16 is by way of example, and the above example is not limited thereto.

The microphone 18 is a voice input means inputting voices and receives input of voices emitted by the user when holding a hands-free telephone conversation using the mobile phone 2. The speaker 19 is a voice output means and outputs received voices of a telephone conversation counterpart when holding a hands-free telephone conversation using the mobile phone 2. That is to say, when a Bluetooth communication line is established between the Bluetooth communication unit 13 and the mobile phone 2 to connect HFP-based wireless communication, the control unit 12 transmits the voices input by the microphone 18 from the Bluetooth communication unit 13 to the mobile phone 2 to transmit them from the mobile phone 2 to the mobile phone network and receives voices received from the mobile phone network by the mobile phone 2 from the mobile phone 2 to the Bluetooth communication unit 13 to output them from the speaker 19.

The hands-free apparatus 1 described above may also include functional blocks required for navigation operation such as a global positioning system (GPS) apparatus as a current position detector detecting a current position of the vehicle, a route search unit searching for a route from the current position to a destination, a map data reading unit reading map data from a recording medium recording the map data, a VICS information reception unit receiving VICS information distributed from a VICS (registered trademark) center, and a voice recognition unit voice-recognizing voices emitted by the user apart from the illustrated functional blocks. In this case, the hands-free apparatus 1 may extract GPS date and time information from a GPS wireless signal received by the GPS apparatus from GPS satellites to acquire a date and time and use the acquired date and time as the outgoing call date and time or the incoming call date and time.

The hands-free apparatus 1 described above is configured to start up and stop in conjunction with the on and off of an ACC switch (a switch turning on and off power supply to vehicle devices). When the ACC switch is switched from on to off in accordance with an operation by the user, for example, power supply to the hands-free apparatus 1 is stopped, and consequently, its apparatus power supply shifts from on to off. In this case, although the various kinds of data stored in the storage memory 17 immediately therebefore is not deleted (is stored), the outgoing call history data, the incoming call history data, the missed call history data, and the telephone directly data stored in the working memory 16 immediately therebefore are deleted.

Figure 3:
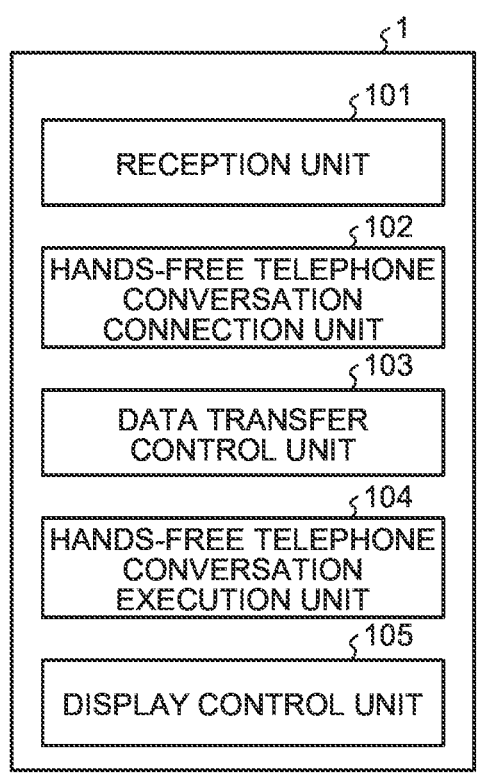
FIG. 3 is a diagram of exemplary functions included in the hands-free apparatus according to the first embodiment.

The following describes details of the functions of the hands-free apparatus 1 of the present embodiment. FIG. 3 is a diagram of exemplary functions included in the hands-free apparatus 1 according to the present embodiment. As illustrated in FIG. 3, the hands-free apparatus 1 of the present embodiment includes a reception unit 101, a hands-free telephone conversation connection unit 102, a data transfer control unit 103, a hands-free telephone conversation execution unit 104, and a display control unit 105.

The reception unit 101, the hands-free telephone conversation connection unit 102, the data transfer control unit 103, the hands-free telephone conversation execution unit 104, and the display control unit 105 are implemented by reading a computer program from the storage memory 17 and executing it by the control unit 12. The functions illustrated in FIG. 3 are by way of example; the control unit 12 of the hands-free apparatus 1 may further implement other functions.

The reception unit 101 receives various kinds of operations from the user. When the user operates the operating unit 14, for example, the reception unit 101 receives the operation by the user via the operating unit 14.

The hands-free telephone conversation connection unit 102 connects to the mobile phone 2 to enable a hands-free telephone conversation pursuant to HFP. More specifically, the hands-free telephone conversation connection unit 102 controls the Bluetooth communication unit 13 to connect to the mobile phone 2 to enable a hands-free telephone conversation.

The hands-free telephone conversation connection unit 102 maintains hands-free telephone conversation-enabled connection with the mobile phone 2 even when synchronization processing to transfer the history data and the phonebook data from the mobile phone 2 by the data transfer control unit 103 described below has not succeeded.

The data transfer control unit 103 receives at least one of the outgoing call history data, the incoming call history data, the missed call history data, and the phonebook data stored in the mobile phone 2 from the mobile phone 2 by a communication protocol pursuant to PBAP. In the present embodiment, the data transfer control unit 103 receives all the outgoing call history data, the incoming call history data, the missed call history data, and the phonebook data from the mobile phone 2.

The data transfer control unit 103 stores the outgoing call history data, the incoming call history data, the missed call history data, and the phonebook data received from the mobile phone 2 in the working memory 16. When the data storage memory 17 is a writable storage medium such as an HDD or a flash memory, the data transfer control unit 103 may store the outgoing call history data, the incoming call history data, the missed call history data, and the phonebook data received from the mobile phone 2 in the storage memory 17.

The data transfer control unit 103, before receiving the history data or the phonebook data from the mobile phone 2, executes synchronization permission checking processing to check whether transfer of the history data or the phonebook data has been permitted in the mobile phone 2.

The history data and the phonebook data include personal information of the user, and thus a permission setting for transferring these data to the hands-free apparatus 1 in the mobile phone 2 is present separately from a permission setting for Bluetooth connection. Thus, even when the mobile phone 2 and the hands-free apparatus 1 are being Bluetooth-connected, if the permission setting is not done in the mobile phone 2, transfer of the history data and the phonebook data based on PBAP from the mobile phone 2 to the hands-free apparatus 1 cannot be performed. Thus, the data transfer control unit 103 checks with the mobile phone 2 whether synchronizing the history data and the phonebook data with the hands-free apparatus 1 is permitted.

When the transfer of the history data or the phonebook data has not been permitted in the mobile phone 2, the data transfer control unit 103 notifies the display control unit 105 that the transfer of the history data or the phonebook data has not been permitted.

When the mobile phone 2 HFP-connected by the hands-free telephone conversation connection unit 102 receives an incoming call, the hands-free telephone conversation execution unit 104 executes a hands-free telephone conversation. The hands-free telephone conversation execution unit 104 receives received voices of a telephone conversation counterpart received by the mobile phone 2 via the Bluetooth communication unit 13 and outputs the received voices from the speaker 19, for example. The hands-free telephone conversation execution unit 104 transmits voices input to the microphone 18 by the user of the hands-free apparatus 1 from the Bluetooth communication unit 13 to the mobile phone 2 to transmit them from the mobile phone 2 to the mobile phone network.

The display control unit 105 causes the display unit 15 to display various kinds of screens. The display control unit 105 causes the display unit 15 to display a display screen on which dial keys are arranged as a display screen for the user to input a telephone number, for example. The display control unit 105 causes the display unit 15 to display the outgoing call history data, the incoming call history data, or the phonebook data in accordance with an operation by the user received by the reception unit 101.

When the synchronization processing to transfer the history data or the phonebook data from the mobile phone 2 has not succeeded, the display control unit 105 causes the display unit 15 to display that there is a possibility that the synchronization processing to transfer the history data or the phonebook data is not permitted in the mobile phone 2 to report it to the user.

The display control unit 105 reports that an operation to manually transfer the history data or the phonebook data by the user is unreceivable. This is because when the transfer of the history data or the phonebook data has not been permitted in the mobile phone 2, not only the transfer of the history data or the phonebook data automatically executed, but also the transfer of the history data or the phonebook data manually started by an operation by the user is prohibited.

The display control unit 105 changes a display mode of an operating button for receiving the operation of manual transfer by the user or hides the operating button to execute the reporting that the operation to manually transfer the history data or the phonebook data by the user is unreceivable, for example. The operating button is a button image displayed on the display unit 15, for example. The change of the display mode is displaying the button image in an inactive manner such as being grayed out, for example.

Reporting that there is a possibility that the synchronization processing to transfer the history data or the phonebook data is not permitted in the mobile phone 2 and reporting that the operation to manually transfer the history data or the phonebook data by the user is unreceivable are examples of first processing in the present embodiment. The display control unit 105 may report both that there is a possibility that the synchronization processing to transfer the history data or the phonebook data is not permitted in the mobile phone 2 and that the operation to manually transfer the history data or the phonebook data by the user is unreceivable or report either of them.

The following describes an action of the configuration described above. The present embodiment will be described on the assumption that with the mobile phone 2 already holding (storing therein) 20 outgoing call history data as a maximum storable number, 20 incoming call history data as a maximum storable number, and 20 missed call history data as a maximum storable number, the user carrying the mobile phone 2 approaches the vehicle 3 to get in, and the ACC switch is turned on, whereby the mobile phone 2 has entered the Bluetooth communication range of the hands-free apparatus 1.

The following first describes a procedure in which in the hands-free apparatus 1 the control unit 12 receives the outgoing call history data, the incoming call history data, the missed call history data, and the phonebook data from the mobile phone 2. The user has registered the mobile phone 2 as a counterpart of Bluetooth communication by the hands-free apparatus 1 in advance.

At the time of setting initial communication, the user inputs a four-digit password for each mobile phone 2 to the hands-free apparatus 1, for example. The hands-free apparatus 1 and the mobile phone 2 generate a link key for use in mutual connection and hold the link key. The hands-free apparatus 1 performs authentication of the link key at the time of initial connection to select the mobile phone 2 to be communicably connected. That is to say, neither HFP-based communication connection nor PBAP-based communication connection is performed between the hands-free apparatus 1 and a nonregistered mobile phone. Basically, the mobile phone 2 of an owner of the vehicle 3 is registered in advance, and Bluetooth communication is performed between the mobile phone 2 and the hands-free apparatus 1. As to the advance registration of the mobile phone 2 as a communication object of the hands-free apparatus 1, the above method is by way of example and is not limited thereto.

In the present example, it is assumed that a plurality of mobile phones 2 to be communicably connected are registered in the hands-free apparatus 1. The user operates the operating unit 14 to set priority for the mobile phones 2 in advance, for example, and the working memory 16 or the storage memory 17 stores therein the priority. Some drivers possess the mobile phones 2, for example, and thus the mobile phones 2 can thus be registered in the hands-free apparatus 1.

Figure 4:
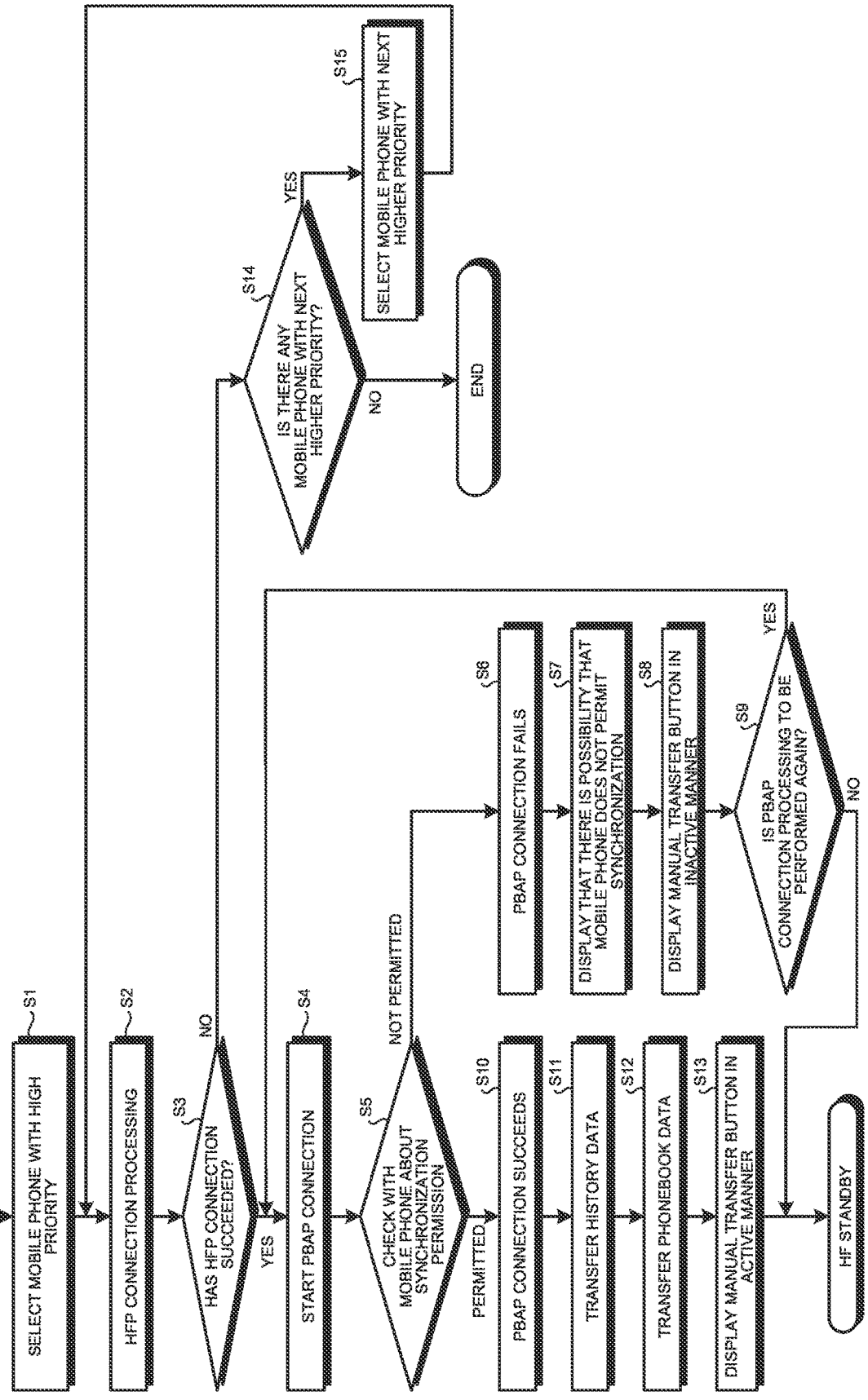
FIG. 4 is a diagram of an exemplary procedure of data transfer processing according to the first embodiment.

FIG. 4 is a diagram of an exemplary procedure of data transfer processing according to the present embodiment. More specifically, the processing of this flowchart is initial data transfer processing executed when the hands-free apparatus 1 connects to the mobile phone 2.

First, the hands-free telephone conversation connection unit 102 selects the mobile phone 2 with high priority as an object to be communicably connected in the HFP-based wireless communication (S1). In the present example, without performing the PBAP-based communication connection first, HFP-based initial communication is first automatically attempted to start connection.

Next, the hands-free telephone conversation connection unit 102 executes processing to automatically connect the HFP-based initial communication for the selected mobile phone 2 (S2). The hands-free telephone conversation connection unit 102 determines whether HFP-based wireless communication connection has succeeded (S3).

If the hands-free telephone conversation connection unit 102 determines that the HFP-based wireless communication connection has succeeded (Yes at S3), the data transfer control unit 103 starts PBAP connection with the mobile phone 2 (S4).

Then, the data transfer control unit 103 executes the synchronization permission checking processing to check whether the transfer of the history data or the phonebook data has been permitted in the mobile phone 2 to the mobile phone 2 (S5).

If the transfer of the history data or the phonebook data has not been permitted in the mobile phone 2 (Not permitted at S5), the PBAP connection fails (S6). In this case, the display control unit 105 causes the display unit 15 to display that there is a possibility that the synchronization processing to transfer the history data or the phonebook data is not permitted in the mobile phone 2.

Figure 5:
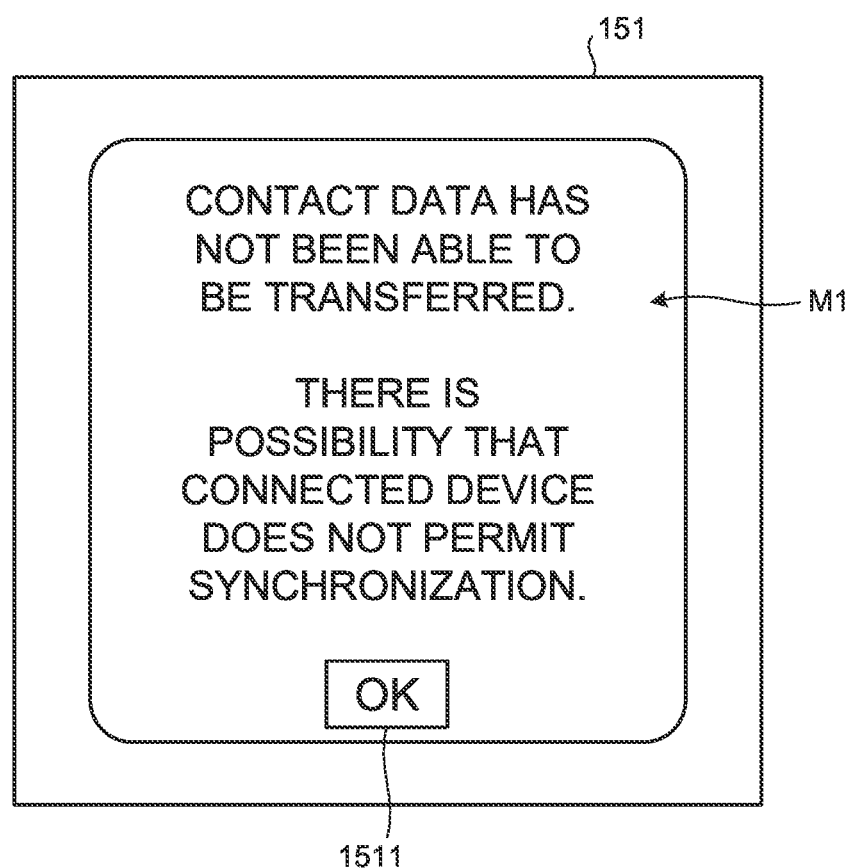
FIG. 5 is a diagram of an exemplary reporting screen according to the first embodiment.

FIG. 5 is a diagram of an exemplary reporting screen 151 according to the present embodiment. The reporting screen 151 reporting that there is a possibility that the synchronization processing to transfer the history data or the phonebook data is not permitted in the mobile phone 2 may be displayed superimposed on a standby screen, for example. As illustrated in FIG. 5, the reporting screen 151 includes a message M1 such as "Contact data has not been able to be transferred. There is possibility that the connected device does not permit synchronization." When the user presses an OK button 1511, the display control unit 105 ends the display of the reporting screen 151.

The present embodiment employs reporting by display; the method of reporting is not limited thereto. The hands-free apparatus 1 may further include a voice control unit (not illustrated), and when the transfer of the history data or the phonebook data has not been permitted in the mobile phone 2, the voice control unit may output a voice message reporting that there is a possibility that the synchronization processing to transfer the history data or the phonebook data is not permitted in the mobile phone 2 from the speaker 19 to perform reporting, for example.

Referring back to the flowchart in FIG. 4, the display control unit 105 reports that the operation to manually transfer the history data or the phonebook data by the user is unreceivable. The display control unit 105 displays the operating button for receiving the operation of manual transfer by the user, that is, a manual transfer button in an inactive manner (S8), for example.

Figure 6:
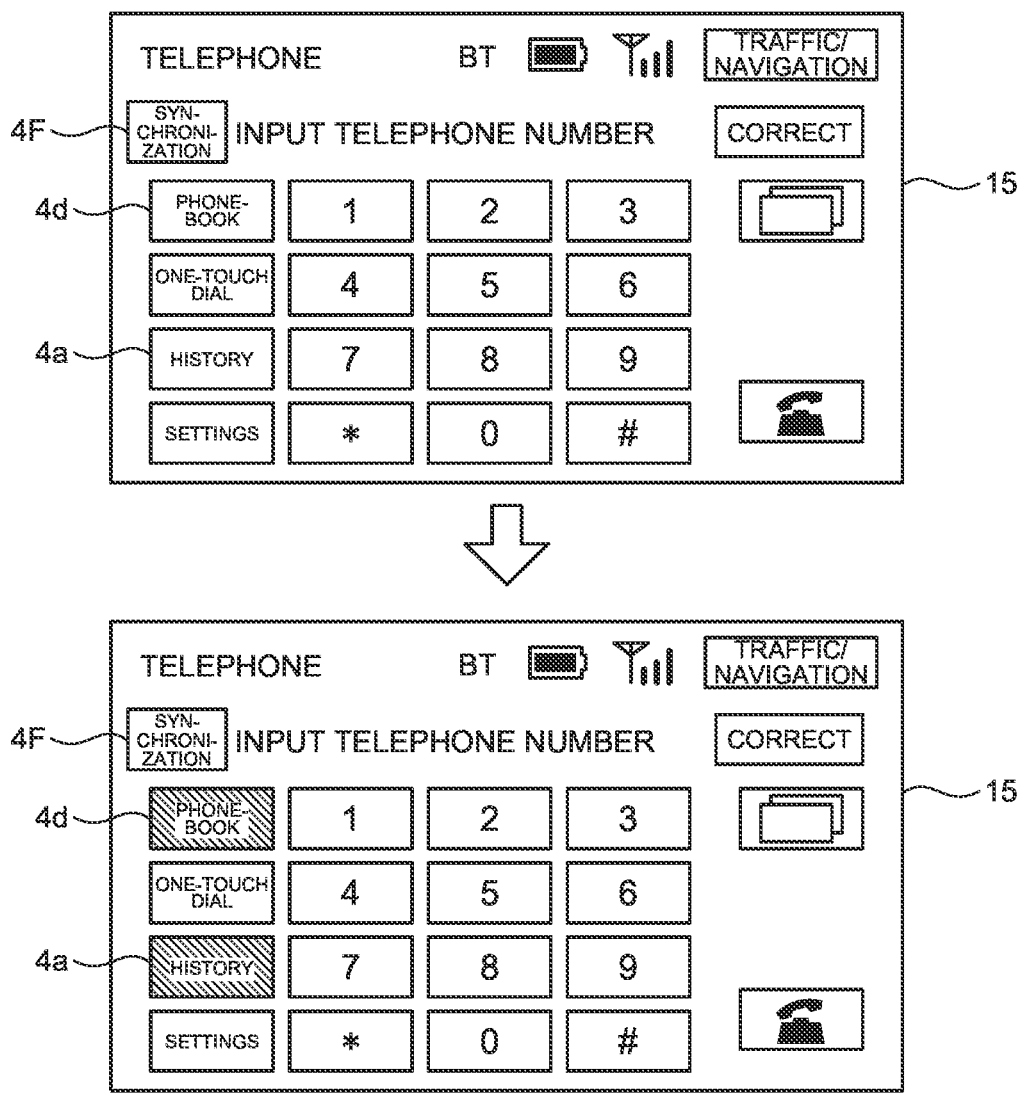
FIG. 6 is a diagram of an exemplary standby screen of a hands-free telephone conversation according to the first embodiment.

FIG. 6 is a diagram of an exemplary standby screen of a hands-free telephone conversation according to the present embodiment. In the standby screen displayed on the display unit 15, a "phonebook button" 4d on which "PHONE-BOOK" is described is a manual transfer button for receiving an operation to manually transfer the phonebook data. A "history button" 4a on which "HISTORY" is described is a manual transfer button for receiving an operation to manually transfer the history data.

In the example illustrated in the upper part of FIG. 6, the manual transfer buttons are displayed in an active manner. In the example illustrated in the lower part of FIG. 6, the manual transfer buttons are displayed in an inactive manner.

In the example illustrated in FIG. 6, the "phonebook button" 4d and the "history button" 4a also function as operating buttons to perform operations described below to cause the display unit 15 to display the phonebook data and cause the display unit 15 to display the history data; the operating buttons for displaying these data and the manual transfer buttons may be provided as separate buttons.

Referring back to the flowchart in FIG. 4, the data transfer control unit 103 determines whether an instruction to perform the PBAP connection processing again has been input by the user (S9). It is assumed that a "synchronization button" 4f on which "SYNCHRONIZATION" is described in the standby screen illustrated in FIG. 6 is an operating button for receiving an operation by the user to perform the PBAP connection processing again, for example.

The user at S7 visually recognizes that the reporting screen 151 described in FIG. 5 has been displayed and presses the OK button 1511 to close the reporting screen 151, for example. The user then operates the mobile phone 2 to change a setting so as to permit PBAP synchronization with the hands-free apparatus 1. Based on the setting change, the history data and the phonebook data include the personal information of the user, and thus these data are permitted to be transferred to the hands-free apparatus 1 in the mobile phone 2. After changing the setting of the mobile phone 2, the user presses the "synchronization button" 4f displayed on the display unit 15 of the hands-free apparatus 1.

When the reception unit 101 receives that the "synchronization button" 4f has been pressed, the reception unit 101 notifies the data transfer control unit 103 that the "synchronization button" 4f has been pressed. In this case, the data transfer control unit 103 determines that the instruction to perform the PBAP connection processing again has been input (Yes at S9). In this case, the process returns to the processing at S4, and the PBAP connection processing is started.

In the present embodiment, when the setting in which synchronization of the history data or the phonebook data to the hands-free apparatus 1 based on PBAP is not permitted has been changed to the setting in which the synchronization is permitted by the user in the mobile phone 2, the hands-free apparatus 1 again executes the processing from the PABP connection processing, and thus there is no need to perform the step of Bluetooth connection again.

If it has been determined that the instruction to perform the PBAP connection processing again has not been input (No at S9), the data transfer control unit 103 does not execute processing to transfer the history data or the phonebook data based on PBAP and transitions to a hands-free (HP) standby state in which an HFP-based hands-free telephone conversation is enabled.

When the "synchronization button" 4f has not been pressed for a certain time or more after the display of the reporting screen 151 at S7, for example, or in other words, in the case of a timeout, the data transfer control unit 103 determines that the instruction to perform the PBAP connection processing again has not been input. The user may be able to explicitly input that the PBAP connection processing is not performed again.

When the processing to transfer the history data and the phonebook data based on PBAP is not executed to provide the hands-free standby state, the history data and the phonebook data is not synchronized to the hands-free apparatus 1, and thus the user cannot inquire the hands-free apparatus 1 about the past outgoing call/incoming call history of the mobile phone 2 and registered names of a phonebook but can make outgoing calls and incoming calls made and received by the mobile phone 2 hands-free telephone conversations from this point onward. When the vehicle 3 is a rent-a-car or the like, for example, and the user does not want to synchronize the history data and the phonebook data of his/her own mobile phone 2 to the hands-free apparatus 1, the hands-free apparatus 1 may be used in this state.

When the transfer of the history data or the phonebook data has been permitted in the mobile phone 2 in the processing at Step S5 (Permitted at S5), the PBAP connection succeeds (S10). In this case, the data transfer control unit 103 transmits a history data transfer request to the mobile phone 2 so as to start processing to transfer the outgoing call history data, the incoming call history data, and the missed call history data (S11).

The mobile phone 2 that has received the history data transfer request transmits the outgoing call history data, the incoming call history data, and the missed call history data to the hands-free apparatus 1 by Bluetooth communication pursuant to PBAP. The data transfer control unit 103 stores the outgoing call history data, the incoming call history data, and the missed call history data transferred from the mobile phone 2 in the working memory 16 or the storage memory 17.

Upon ending the processing to transfer the history data, the data transfer control unit 103 transmits a phonebook data transfer request to start processing to transfer the phonebook data to the mobile phone 2 (S12).

It has been described that at S11 and S12 the history data or the phonebook data is automatically transferred from the mobile phone 2 to the hands-free apparatus 1; the user may select and set manual transfer or automatic transfer in the mobile phone 2 or the hands-free apparatus 1, and the data transfer control unit 103 may perform transfer processing in accordance with this setting. In the setting not performing automatic transfer, the processing at S11 and S12 in FIG. 4 is skipped, and then the processing to transfer the history data or the phonebook data may be executed with any timing by the user. Whether automatic transfer of the history data and the phonebook data is performed may be set individually for each data or be set collectively.

The display control unit 105 displays the manual transfer button in an active manner (S13). Note that when the manual transfer button is displayed in an active manner in the initial display, the display control unit 105 need not especially change the display with this timing.

Upon establishing the HFP-based wireless communication with the mobile phone 2, the hands-free telephone conversation connection unit 102 shifts to hands-free (HF) standby processing. During execution of the hands-free standby processing, the hands-free apparatus 1 is enabled to make an outgoing call or receive an incoming call via the mobile phone 2. The hands-free standby processing continues until the power of the hands-free apparatus 1 is turned off or the HFP-based wireless communication with the mobile phone 2 is cancelled. Examples of the case in which the HFP-based wireless communication with the mobile phone 2 is cancelled include a case in which an operation to cancel connection is performed on the hands-free apparatus 1 or the mobile phone 2 and a case in which the mobile phone 2 has left the Bluetooth communication range of the hands-free apparatus 1.

If the hands-free telephone conversation connection unit 102 determines that the HFP-based wireless communication connection has not succeeded (failed) (No at S3), the hands-free telephone conversation connection unit 102 determines whether there is any mobile phone 2 with next higher priority (S14).

If the hands-free telephone conversation connection unit 102 determines that there is any mobile phone 2 with next higher priority (Yes at S14), the hands-free telephone conversation connection unit 102 selects the mobile phone 2 with next higher priority as an object to be wirelessly communicably connected (S15) and returns to S2 described above to repeatedly perform the processing described above.

If the hands-free telephone conversation connection unit 102 determines that there is no mobile phone 2 with next higher priority (No at S15), the hands-free telephone conversation connection unit 102 ends the processing of this flowchart.

In the processing procedure described in FIG. 4, the Bluetooth communication unit 13 of the hands-free apparatus 1 simultaneously connects (connects in a multi-profile manner) the HFP-based wireless communication and the PBAP-based wireless communication; these wireless communications may be connected serially without being simultaneously connected.

The following describes the processing to transfer the outgoing call history data, the incoming call history data, and the missed call history data described in FIG. 4 and the like more specifically.

FIGS. 7A to 7B are diagrams of an exemplary correspondence relation between the outgoing call history data and the phonebook data according to the present embodiment. More specifically, FIG. 7A is exemplary outgoing call history data stored in the mobile phone 2. FIG. 7B is exemplary phonebook data stored in the mobile phone 2. FIG. 7C is exemplary outgoing call history data stored in or displayed by the hands-free apparatus 1.

FIGS. 8A to 8C are diagrams of an exemplary correspondence relation between the incoming call history data and the phonebook data according to the present embodiment. More specifically, FIG. 8A is exemplary incoming call history data stored in the mobile phone 2. FIG. 8B is exemplary phonebook data stored in the mobile phone 2. FIG. 8C is exemplary incoming call history data stored in or displayed by the hands-free apparatus 1.

FIGS. 9A to 9C are diagrams of an exemplary correspondence relation between the missed call history data and the phonebook data according to the present embodiment. More specifically, FIG. 9A is exemplary missed call history data stored in the mobile phone 2. FIG. 9B is exemplary phonebook data stored in the mobile phone 2. FIG. 9C is exemplary missed call history data stored in or displayed by the hands-free apparatus 1.

The data transfer control unit 103 receives the outgoing call history data including registered names, outgoing call telephone numbers, and outgoing call dates and times illustrated in FIG. 7A from the mobile phone 2 and causes the working memory 16 or the storage memory 17 to store these therein.

The data transfer control unit 103 receives the incoming call history data including registered names, incoming call telephone numbers, and incoming call dates and times illustrated in FIG. 8A from the mobile phone 2 and causes the working memory 16 or the storage memory 17 to store these therein.

The data transfer control unit 103 receives the missed call history data including registered names, missed call telephone numbers, and missed call dates and times illustrated in FIG. 9A from the mobile phone 2 and causes the working memory 16 or the storage memory 17 to store these therein.

When the incoming call history data, the outgoing call history data, and the missed call history data do not include the registered names in the mobile phone 2, the data transfer control unit 103 may associate the telephone numbers included in the incoming call history data, the outgoing call history data, and the missed call history data and the registered names associated with the telephone numbers in the phonebook data with each other to add the registered names to the incoming call history data, the outgoing call history data, and the missed call history data and to cause the working memory 16 or the storage memory 17 to store these therein. Upon the occurrence of a request to display the outgoing call history data, the incoming call history data, and the missed call history data, the display control unit 105 causes the display unit 15 to display the outgoing call history data, the incoming call history data, and the missed call history data stored in the working memory 16 or the storage memory 17. That is to say, the display control unit 105 can cause the display unit 15 to display the registered names transferred from the mobile phone 2 without reading the registered names from the phonebook data stored in the working memory 16 or the storage memory 17.

The incoming call history data, the outgoing call history data, and the missed call history data may be stored in the working memory 16 or the storage memory 17 without the registered names included. In this case, the display control unit 105 displays the telephone numbers included in the incoming call history data, the outgoing call history data, and the missed call history data and the registered names associated with the telephone numbers in the phonebook data in association with each other on the display unit 15.

Upon completing the HFP connection processing described in FIG. 4 by the hands-free telephone conversation connection unit 102, the user operates the operating unit 14 of the hands-free apparatus 1 and can thereby perform outgoing call processing and incoming call processing.

After the data transfer control unit 103 receives the outgoing call history data, the incoming call history data, and the missed call history data from the mobile phone 2 by the initial connection processing with the mobile phone 2 described in FIG. 4, the hands-free apparatus 1 or the mobile phone 2 may execute new outgoing call processing, new incoming call processing, or new missed call processing. Then, when the user operates the operating unit 14 to make a request to display the outgoing call history data, the incoming call history data, or the missed call history data, when a registered name corresponding to an outgoing call telephone number, an incoming call telephone number, or a missed call telephone number with which the new outgoing call processing, incoming call processing, or missed call processing has been performed is present in the phonebook data transferred from the mobile phone 2, the display control unit 105 causes the display unit 15 to display the registered name as illustrated in FIG. 7C, FIG. 8C, or FIG. 9C.

More specifically, it is assumed that the hands-free telephone conversation connection unit 102 has performed outgoing call processing to the telephone number of "Ichiro Kato" as the new outgoing call processing. In this case, when the registered name "Ichiro Kato" is registered in the phonebook data, the display control unit 105 reads the registered name "Ichiro Kato" from the phonebook data and causes the display unit 15 to display it as illustrated in FIG. 7C. When an incoming call occurs from the telephone number of "Ichiro Yoshimoto" as the new incoming call processing, when this incoming call telephone number is registered in the phonebook data, the display control unit 105 reads the registered name "Ichiro Yoshimoto" from the phonebook data and causes the display unit 15 to display it as illustrated in FIG. 8C. When a new missed call occurs from the telephone number of "Saburo Watanabe," the display control unit 105 reads the registered name "Saburo Watanabe" from the phonebook data and causes the display unit 15 to display it as illustrated in FIG. 9C.

Upon the occurrence of a request to display all history data displaying the outgoing call history data, the incoming call history data, and the missed call history data collectively in reverse chronological order, as to the incoming call history data and the missed call history data, the display control unit 105 selects and displays a predetermined number of incoming call history data and the missed call history data with a later incoming call date and time or missed call date and time out of the whole of the data regardless of whether they are the same (duplicated) in the incoming call telephone number or the missed call telephone number. As to the outgoing call history data, the display control unit 105 selects and displays only the latest outgoing call history data out of the outgoing call history data with the same (duplicated) outgoing call telephone number.

FIG. 10 is a diagram of exemplary outgoing call history data, incoming call history data, missed call history data, and all history data according to the present embodiment. In the example illustrated in FIG. 10, the outgoing call telephone number of "Taro Abe" is duplicated. In this case, the display control unit 105 displays only the outgoing call history with the latest outgoing call date and time (the outgoing call history data with an outgoing call date and time of August 10 12:15) out of the outgoing call histories of "Taro Abe" and does not display the outgoing call history with the outgoing call date and time not being the latest.

The following describes a procedure for the control unit 12 receiving the outgoing call history data, the incoming call history data, the missed call history data, and the phonebook data from the mobile phone 2 and storing these therein and a procedure for making an outgoing call using the stored outgoing call history data, incoming call history data, and missed call history data in the hands-free apparatus 1. The following describes the outgoing call history data and the incoming call history data; the same holds true for the missed call history data.

Figure 11:
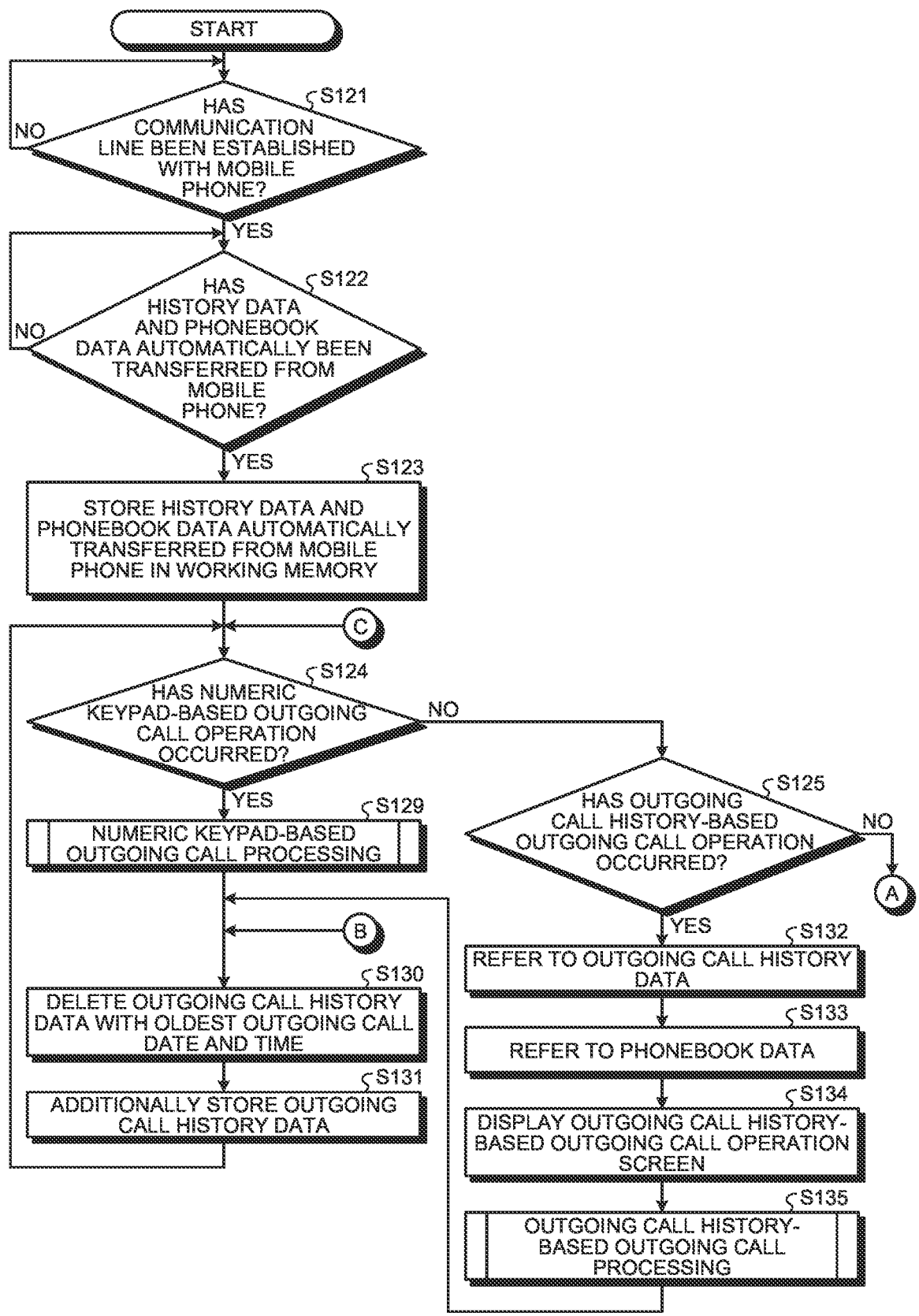
FIG. 11 is a diagram of an exemplary procedure of processing to make an outgoing call using the outgoing call history data, the incoming call history data, and the phonebook data to be executed by the hands-free apparatus of the first embodiment.
Figure 12:
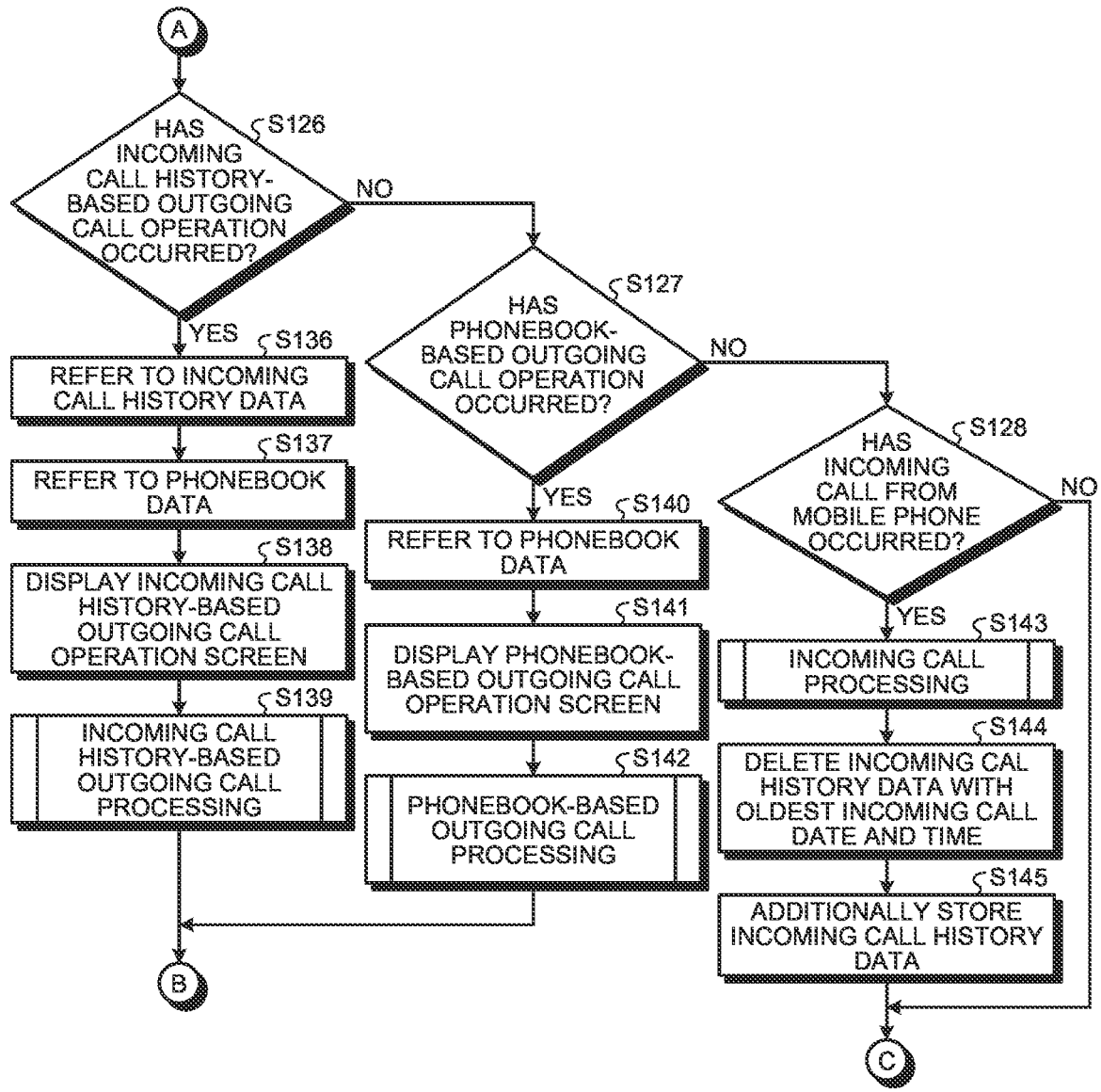
FIG. 12 is a diagram of an exemplary procedure of the processing to make an outgoing call using the outgoing call history data, the incoming call history data, and the phonebook data to be executed by the hands-free apparatus of the first embodiment.

FIG. 11 and FIG. 12 are diagrams of an exemplary procedure of processing to make an outgoing call using the outgoing call history data, the incoming call history data, and the phonebook data to be executed by the hands-free apparatus 1 of the present embodiment. The processing executed by the control unit 12 in FIG. 11 and FIG. 12 is the processing implemented by the reception unit 101, the hands-free telephone conversation connection unit 102, the data transfer control unit 103, the hands-free telephone conversation execution unit 104, or the display control unit 105 described in FIG. 3, for example.

Figure 13:
FIG. 13 is a diagram of exemplary outgoing call history data according to the first embodiment.
Figure 14:
FIG. 14 is a diagram of exemplary incoming call history data according to the first embodiment.

FIG. 13 described in FIG. 11 and FIG. 12 is a diagram of exemplary outgoing call history data according to the present embodiment. FIG. 14 is a diagram of exemplary incoming call history data according to the present embodiment. FIG. 15 is a diagram of an exemplary transition of display screens when the user performs an outgoing call operation from an outgoing call history according to the present embodiment. FIG. 16 is a diagram of an exemplary transition of display screens when the user performs an outgoing call operation from an incoming call history according to the present embodiment. FIG. 17 is a diagram of an exemplary transition of display screens when the user performs an outgoing call operation from a phonebook according to the present embodiment. FIG. 18 is a diagram of exemplary phonebook data according to the present embodiment.

Referring back to the flowchart in FIG. 11, first, upon determining that the mobile phone 2 is present within the Bluetooth communication range of the hands-free apparatus 1 and the Bluetooth communication unit 13 has established a communication line with the mobile phone 2 (Yes at S121), the control unit 12 of the hands-free apparatus 1 waits for the outgoing call history data, the incoming call history data, and the phonebook data to be automatically transferred to the Bluetooth communication unit 13 from the mobile phone 2 (S122).

Upon determining that the outgoing call history data, the incoming call history data, and the phonebook data have automatically been transferred from the mobile phone 2 (Yes at S122), the control unit 12 causes the working memory 16 or the storage memory 17 to store therein the outgoing call history data, the incoming call history data, and the phonebook data automatically transferred from the mobile phone 2 (S123).

It is assumed that the numbers of the outgoing call history data and the incoming call history data automatically transferred from the mobile phone 2 are each 20, for example. It is also assumed that the numbers of the outgoing call history data and the incoming call history data that can be stored in the working memory 16 are each five, for example. That is to say, the number of the outgoing call history data or the incoming call history data that can be stored in the working memory 16 is smaller than the number of the outgoing call history data or the incoming call history data automatically transferred from the mobile phone 2.

In this case, the control unit 12 discards a piece of outgoing call history data with an older outgoing call date and time out of the outgoing call history data automatically transferred from the mobile phone 2 and causes the working memory 16 to store therein five outgoing call history data with later outgoing call dates and times with higher priority out of the 20 outgoing call history data automatically transferred from the mobile phone 2 as mobile phone outgoing call history data, for example. The control unit 12 discards incoming call history data with an older incoming call date and time out of the incoming call history data and causes the working memory 16 to store therein five incoming call history data with later incoming call dates and times with higher priority out of the 20 incoming call history data automatically transferred from the mobile phone 2 as mobile phone incoming call history data.

Immediately after the outgoing call history data has automatically been transferred from the mobile phone 2, the control unit 12 holds the outgoing call history data illustrated at (a) in FIG. 13 as the outgoing call history data of the working memory 16. When the user performs an operation to display the outgoing call history data in this state, the control unit 12 causes the display unit 15 to display the display screen illustrated at (b) in FIG. 15. Immediately after the incoming call history data has automatically been transferred from the mobile phone 2, the control unit 12 holds the incoming call history data illustrated at (b) in FIG. 14 as the incoming call history data of the working memory 16 and, when the user performs an operation to display the incoming call history data in this state, causes the display unit 15 to display the display screen illustrated at (b) in FIG. 16.

Thus, when the mobile phone 2 and the hands-free apparatus 1 establish the Bluetooth communication line, the outgoing call history data and the incoming call history data stored by the mobile phone 2 before the Bluetooth communication line is established are automatically transferred to the working memory 16 of the hands-free apparatus 1, thus the mobile phone 2 and the hands-free apparatus 1 form one telephone system, and thus a hands-free telephone conversation can be held by this telephone system. After the mobile phone 2 and the hands-free apparatus 1 thus form the one telephone system, the user selects any of a dial key input-based outgoing call operation, an outgoing call history-based outgoing call operation, an incoming call history-based outgoing call operation, and a phonebook-based outgoing call operation and can thereby perform an outgoing call operation and can wait for an incoming call from the mobile phone network.

In the flowchart of FIG. 4, as a procedure of Bluetooth communication, the simultaneous connection of HFP and PBAP is performed; serial profile switching may be performed, in which the PBAP-based wireless communication connection is established, then the PBAP-based wireless communication is disconnected, and then the HFP-based wireless communication connection is performed. When such serial connection is performed, after the HFP-based wireless communication connection is performed after the PBAP-based data transfer, when a new incoming call occurs in the mobile phone 2, or when new outgoing call processing is performed by the operating unit 14, for the mobile phone 2, the incoming call history data and the outgoing call history data including the incoming call and the outgoing call are after all its own history data and are thus held in its own memory. Thus, the control unit 12 of the hands-free apparatus 1 can also perform the PBAP-based wireless communication during the HFP-based wireless communication (simultaneous connection) in order to acquire these latest outgoing/incoming call history data again from the mobile phone 2.

However, if simultaneous connection is avoided as much as possible, in the serial connection, when the HFP-based wireless communication connection is disconnected, and the PBAP-based wireless communication connection is performed, during the time the mobile phone 2 and the hands-free apparatus 1 forming the one telephone system for holding a hands-free telephone conversation are substantially separated from each other, thus causing a state in which a hands-free telephone conversation cannot be held. Given these circumstances, when the HFP-based wireless communication connection is performed, even after that, the hands-free apparatus 1 may acquire the latest outgoing/incoming call history data on its own and manage these on its own only by the HFP-based wireless communication connection. The following describes this point.

Referring back to the flowchart of FIG. 11, the control unit 12 determines whether the user has performed the dial key input-based outgoing call operation (S124) and determines whether the user has performed the outgoing call history-based outgoing call operation (S125). Subsequently, in the flowchart of FIG. 12, the control unit 12 determines whether the user has performed the incoming call history-based outgoing call operation (S126), determines whether the user has performed the phonebook-based outgoing call operation (S127), and determines whether an incoming call has occurred from the mobile phone network (S128).

Upon determining that the user has performed the dial key input-based outgoing call operation (Yes at S124), the control unit 12 performs outgoing call processing to make an outgoing call with the telephone number input with the dial keys by the user as an outgoing call telephone number (S129). Upon ending the dial key input-based outgoing call processing, the control unit 12 deletes the outgoing call history data with the oldest outgoing call date and time out of the outgoing call history data stored in the working memory 16 at the point in time as illustrated at (b) in FIG. 13 (S130) and causes the working memory 16 to additionally store therein the latest outgoing call history data of the apparatus representing the dial key input-based outgoing call as self-outgoing call history data (S131).

That is to say, when the user operates the dial keys to input a telephone number "09000000100," for example, to perform an operation to make an outgoing call with the telephone number "09000000100" as the outgoing call telephone number, the control unit 12 causes the working memory 16 to additionally store therein the outgoing call history data representing the telephone number "09000000100" as the self-outgoing call history data as illustrated at (b) in FIG. 13. In this case, the control unit 12 stores therein a date and time acquired by the GPS apparatus of the hands-free apparatus 1 as an outgoing call date and time corresponding to the telephone number "09000000100" as a time stamp. That is to say, at (b) in FIG. 13, the outgoing call date and time of the latest telephone number "09000000100" is the date and time acquired by the GPS apparatus of the hands-free apparatus 1, whereas the outgoing call dates and times of the residual four telephone numbers are dates and times acquired by the timepiece unit of the mobile phone 2. When the user performs an operation to display the outgoing call history data in this state, the control unit 12 causes the display unit 15 to display the display screen illustrated at (c) in FIG. 15.

Upon determining that the user has performed the outgoing call history-based outgoing call operation by pressing a "history button" 4*a* and then pressing an "outgoing call history button" 4*b* (Yes at S125), the control unit 12 refers to the outgoing call history data stored in the working memory 16 (S132), refers to the phonebook data stored in the working memory 16 (S133), and causes the display unit 15 to display an outgoing call history-based outgoing call operation screen as illustrated at (b) and (c) in FIG. 15 (S134). In this case, the control unit 12, if the outgoing call telephone number of the outgoing call history data is registered in the phonebook data, causes the display unit 15 to display the registered name corresponding to the telephone number and, if the outgoing call telephone number of the outgoing call history data is not registered in the phonebook data, causes the display unit 15 to display the telephone number.

Next, the control unit 12 performs outgoing call processing to make an outgoing call with the telephone number selected by the user as the outgoing call telephone number (S135). Upon ending the outgoing call history-based outgoing call processing, the control unit 12, in this case also, deletes the outgoing call history data with the oldest outgoing call date and time out of the outgoing call history data stored in the working memory 16 at the point in time (S130) and causes the working memory 16 to additionally store therein the latest outgoing call history data of the apparatus representing the outgoing call history-based outgoing call as the self-outgoing call history data (S131). In this case also, the control unit 12 stores therein a date and time acquired by the GPS apparatus of the hands-free apparatus 1 as an outgoing call date and time corresponding to the outgoing call telephone number as a time stamp.

Upon determining that the user has performed the incoming call history-based outgoing call operation by pressing the "history button" 4*a* and then pressing an "incoming call history button" 4*c* (Yes at S126), the control unit 12 refers to the incoming call history data stored in the working memory 16 (S136), refers to the phonebook data stored in the working memory 16 (S137), and causes the display unit 15 to display an incoming call history-based outgoing call operation screen as illustrated at (b) and (c) in FIG. 16 (S138). In this case, the control unit 12, if the outgoing call telephone number of the incoming call history data is registered in the phonebook data, causes the display unit 15 to display the registered name corresponding to the telephone number and, if the outgoing call telephone number of the incoming call history data is not registered in the phonebook data, causes the display unit 15 to display the telephone number.

Next, the control unit 12 performs outgoing call processing to make an outgoing call with the telephone number selected by the user as the outgoing call telephone number (S139). Upon ending the incoming call history-based outgoing call processing, the control unit 12, in this case also, deletes the outgoing call history data with the oldest outgoing call date and time out of the outgoing call history data stored in the working memory 16 at the point in time (S130) and causes the working memory 16 to additionally store therein the latest outgoing call history data of the apparatus representing the incoming call history-based outgoing call as the self-outgoing call history data (S131). In this case also, the control unit 12 stores therein a date and time acquired by the GPS apparatus of the hands-free apparatus 1 as an outgoing call date and time corresponding to the outgoing call telephone number as a time stamp.

Upon determining that the user has performed the phonebook-based outgoing call operation by pressing a "phonebook" button 4*d* (Yes at S127), the control unit 12 refers to the phonebook data stored in the working memory 16 (S140) and causes the display unit 15 to display a phonebook-based outgoing call operation screen as illustrated at (b) in FIG. 17 (S141). Next, the control unit 12 performs outgoing call processing to make an outgoing call with the telephone number selected by the user out of them as the outgoing call telephone number (S142). Upon ending the phonebook-based outgoing call processing, the control unit 12, in this case also, deletes the outgoing call history data with the oldest outgoing call date and time out of the outgoing call history data stored in the working memory 16 at the point in time (S130) and causes the working memory 16 to additionally store therein the latest outgoing call history data of the apparatus representing the phonebook-based outgoing call as the self-outgoing call history data (S131). In this case also, the control unit 12 stores therein a date and time acquired by the GPS apparatus of the hands-free apparatus 1 as an outgoing call date and time corresponding to the outgoing call telephone number as a time stamp.

Further, upon determining that an incoming call has occurred from the mobile phone network from the mobile phone 2 via the Bluetooth communication unit 13 (Yes at S128), the control unit 12 performs incoming call processing such as notification for providing notification of the incoming call (S143), and upon ending the incoming call processing, deletes the incoming call history data with the oldest incoming call date and time out of the incoming call history data stored in the working memory 16 at the point in time (S144), and causes the working memory 16 to additionally store therein the latest incoming call history data of the apparatus representing the incoming call as self-incoming call history data (S145).

That is to say, upon receiving a telephone number "09000000200" as an incoming call telephone number from the mobile phone network via the Bluetooth communication unit 13, the control unit 12 causes the working memory 16 to additionally store therein the incoming call history data representing the telephone number "09000000200" as the self-incoming call history data.

By doing so, even when the PBAP-based wireless communication connection is not performed after the HFP-based wireless communication connection, when new incoming call processing or outgoing call processing occurs after S1, self-outgoing/incoming call history data can be added and displayed on the display unit 15. Consequently, there is still no need to perform HPF-and-PBAP simultaneous connection, and after the HFP-based wireless communication connection, there is no need to disconnect the HFP-based wireless communication connection and to connect to the PBAP-based wireless communication connection, and thus the mobile phone 2 and the hands-free apparatus 1 forming the one telephone system can be prevented from being substantially separated from each other.

The following describes processing to display the outgoing/incoming call history data received by the PBAP-based wireless communication and outgoing/incoming call history data occurring in the outgoing call processing and the incoming call processing occurring at and after connecting HFP-based wireless communication.

In an HFP wireless-connected state, the mobile phone 2 at the time of an incoming call transmits the incoming call telephone number to the hands-free apparatus 1, in which incoming call date and time information is not transmitted. Thus, the control unit 12 stores therein a date and time acquired by the GPS apparatus of the hands-free apparatus 1 as the incoming call date and time corresponding to the telephone number "09000000200" as a time stamp. That is to say, at (b) in FIG. 14, the incoming call date and time of the latest telephone number "09000000200" is the date and time acquired by the GPS apparatus of the hands-free apparatus 1, whereas the incoming call dates and times of the residual four telephone numbers are dates and times acquired by the timepiece unit of the mobile phone 2. When the user performs an operation to display the incoming call history data in this state, the control unit 12 causes the display unit 15 to display the display screen illustrated at (c) in FIG. 16.

The foregoing describes a case in which when the number of the outgoing call history data or the incoming call history data that can be stored in the working memory 16 is smaller than the number of the outgoing call history data or the incoming call history data automatically transferred from the mobile phone 2, the outgoing call history data or the incoming call history data with an older outgoing call date and time or incoming call date and time out of the outgoing call history data or the incoming call history data automatically transferred from the mobile phone 2 is discarded, and the outgoing call history data or the incoming call history data with a later outgoing call date and time or incoming call date and time out of the outgoing call history data or the incoming call history data automatically transferred from the mobile phone 2 is stored in the working memory 16 with higher priority; a number (five in the present embodiment) to be automatically transferred to the mobile phone 2 by the hands-free apparatus 1 when the PBAP-based wireless communication is connected may be designated, and the outgoing call history data or the incoming call history data with a later outgoing call date and time or incoming call date and time may be stored in the working memory 16 with higher priority.

The above configuration describes a case in which when new outgoing call processing or new incoming call processing is performed in the hands-free apparatus 1, the oldest outgoing call history data or the oldest incoming call history data out of the outgoing call history data or the incoming call history data stored in the working memory 16 is deleted; from the viewpoint of the user, there is a demand such as described below, and thus the control unit 12 may perform alternative processing described below. This is processing required when the PBAP-based wireless communication connection is not performed at and after connecting HFP-based wireless communication as in the present example.

That is to say, when the date and time measured by the timepiece unit of the mobile phone 2 and the date and time acquired by the GPS apparatus of the hands-free apparatus 1 are compared with each other, the date and time measured by the timepiece unit of the mobile phone 2 may have a larger error and be incorrect compared with the date and time acquired by the GPS apparatus and can be set freely by the user and may thus be set forward or conversely be set backward by a certain time (10 minutes, for example) intentionally by the user.

Thus, if the user sets the date and time of the mobile phone 2 forward by the certain time, and the hands-free apparatus 1 stores the date and time set forward in the working memory 16, when the outgoing call history data and the incoming call history data automatically transferred from the mobile phone 2 and the outgoing call history data and the incoming call history data of the hands-free apparatus 1 itself are sorted in chronological order in this state, even though the outgoing call history data or the incoming call history data performing new outgoing call processing or new incoming call processing by the hands-free apparatus 1 is the latest in terms of time axis, it is not displayed at the top column on a display screen in list form and is displayed at a column other than the top column (a second or third column, for example). This situation causes deviation between a time axis kept in mind by the user and a time axis displayed by the display unit 15 and thus causes the user to have a sense of discomfort.

To address this trouble, the control unit 12 displays the outgoing call history data and the incoming call history data automatically transferred from the mobile phone 2 arranged in chronological order at columns other than the top column only within their range and displays the new outgoing call history data and the new incoming call history data of the apparatus at the top column. Thus, display can be performed in harmony with the time axis kept in mind by the user, thus enabling the user not to have a sense of discomfort.

When displaying the outgoing call history data and the incoming call history data automatically transferred from the mobile phone 2 arranged in chronological order, even without sort according to date and time data included in the outgoing call history data and the incoming call history data, if the outgoing call history data and the incoming call history data include outgoing call order data representing an outgoing call order and incoming call order data representing an incoming call order, respectively, the control unit 12 may display the outgoing call history data and the incoming call history data arranged based on the outgoing call order data and the incoming call order data.

Even when the outgoing call order data and the incoming call order data are not explicitly included, when data is transmitted in list form as in FIG. 7A, FIG. 8A, and FIG. 9A from the mobile phone 2 and is received by the hands-free apparatus 1, display may be performed based on a rule that upper data is later data. That is to say, the mobile phone 2 transmits the data in such a manner that an actual outgoing call order and incoming call order can be identified by the hands-free apparatus 1.

In this case, in the mobile phone 2 of a certain type, when an incoming call occurred from A on 12:00:00, and an incoming call occurred from B on 12:00:30, for example, when the time stamp is represented in terms of up to minutes not seconds, they are absolutely the same 12:00, which is stored as the incoming call history data of the mobile phone 2. When these data are received by the hands-free apparatus 1, and even if they are sorted in chronological order, they cannot be ranked, and thus it is convenient if the mobile phone 2 imparts the outgoing call order data and the incoming call order data or transmits them in list form described above. Thus, display can be performed in harmony with the time axis kept in mind by the user, thus enabling the user not to have a sense of discomfort.

In these cases, the date and time data included in the outgoing call history data and the incoming call history data is secondary, and the outgoing call order data and the incoming call order data described above are actual incoming call order and outgoing call order of the user. The mobile phone 2 repeats the incoming call processing and the outgoing call processing in its single operations; they are its own single operations, thus the outgoing/incoming call orders can be grasped, and thus outgoing/incoming call histories can be managed according to those orders. Thus, without being bound by the outgoing call date and time and the incoming call date and time by its own timepiece unit, the mobile phone 2 transmits each outgoing call and each incoming call to the hands-free apparatus 1 with the outgoing call order data and the incoming call order data imparted thereto, and the hands-free apparatus 1 performs processing to arrange the outgoing/incoming call history data based on the incoming call order data and the outgoing call order data. Alternatively, the list formed with an actual outgoing call order and incoming call order determined by the mobile phone 2 without imparting the outgoing call order data and the incoming call order data is transmitted to the hands-free apparatus 1, and the hands-free apparatus 1 performs processing to perform arrangement in order of actual outgoing call/incoming call orders in accordance with the above rule.

By doing so, if the timepiece of the mobile phone 2 is set forward or backward with certain timing, when an outgoing call or an incoming call occurs immediately thereafter, outgoing call history display and incoming call history display of the mobile phone 2 are displayed in accordance with the actual orders, whereas the outgoing call date and time and the incoming call date and time attached to each data are different from the display order. Consequently, when such outgoing/incoming call history data is sorted based on the outgoing call date and time and the incoming call date and time by the hands-free apparatus 1, it is displayed in order different from the actual one. It can be thus said that the method of the outgoing call order data and the incoming call order data or the list form method are advantageous for performing arrangement in the actual outgoing/incoming call orders.

Consequently, the control unit 12 can display the data on the display unit 15 as the actual outgoing call order and incoming call order by the mobile phone 2. After performing such data processing and then performing the outgoing call processing by its own dial key input, the outgoing call history-based outgoing call processing, the incoming call history-based outgoing call processing, and the phonebook data-based outgoing call processing as described above, the hands-free apparatus 1 deletes the outgoing call history data with the oldest outgoing call order data or the outgoing call history data regarded as oldest out of the outgoing call history data stored in the working memory 16 at the point in time and additionally causes the working memory 16 to store therein the latest outgoing call history data of the apparatus representing the outgoing call by the outgoing call history as the self-outgoing call history data. Meanwhile, when new incoming call processing occurs, the control unit 12 deletes the outgoing call history data with the oldest incoming call order data or the incoming call history data regarded as oldest out of the incoming call history data stored in the working memory 16 at the point in time and causes the working memory 16 to additionally store therein the latest incoming call history data of the apparatus representing the incoming call by the incoming call history data as the self-incoming call history data.

In these outgoing call processing and the incoming call processing, the control unit 12 stores therein the date and time acquired by the GPS apparatus of the hands-free apparatus 1 as the outgoing call date and time corresponding to the outgoing call telephone number and the incoming call date and time corresponding to the incoming call telephone number as a time stamp. Thus, display can be performed in harmony with the time axis kept in mind by the user, thus enabling the user not to have a sense of discomfort.

Upon a request to display all history data collectively displaying the outgoing call history data and the incoming call history data, the control unit 12 requires certain sorting processing compared with a case in which only the outgoing call history data or only the incoming call history data is displayed. That is to say, when the incoming call history data and the outgoing call history data are transmitted with the actual time axis with the outgoing call order data and the incoming call order data included so that the chronological order can be grasped or transmitted in list form described above without including these data from the mobile phone 2 as described above, when performing display in the just notified order not based on the outgoing call date and time and the incoming call date and time included in the received data as described above, the hands-free apparatus 1 performs display in the just display order in the mobile phone 2 in the case of only the outgoing call history display and only the incoming call history display.

When displaying all data, the hands-free apparatus 1 can grasp the latest data out of the outgoing call history data and the latest data out of the incoming call history data but may have difficulty in actually identifying which of the two latest data is the latest. Given these circumstances, in the present example, when displaying all history data, the control unit 12 compares the outgoing call date and time included in the outgoing call history data and the incoming call date and time included in the incoming call history data with each other and displays one with the latest date and time as the latest data. For a case of five incoming call history data and five outgoing call history data, for example, the control unit 12 sorts the ten data in chronological order and displays them in this order. Thus, in almost all cases, the outgoing call history data and the incoming call history data can be displayed in order almost as the actual time axis of the user. However, when the time stamp function of the mobile phone 2 is up to "minutes," when an incoming call occurred from A on 12:00:00, and then an outgoing call was made to B on 12:00:30, the outgoing call date and time and the incoming call date and time are absolutely the same 12:00, and thus in this case, the control unit 12 performs certain sorting processing such that the outgoing call is displayed to be later than the incoming call or vice versa.

When the chronological order of three pieces of incoming call history data (A to C) received by the PBAP-based wireless communication can be grasped as described above, and the chronological order of outgoing call history data (D to F) received by PBAP can be grasped, the control unit 12 compares the dates and times of the outgoing call history data and the incoming call history data with each other as follows and performs sorting processing.

First, the control unit 12 compares the dates and times of A and D with each other and sets the later one to be the first (A, for example) and then compares B and D with each other and sets the later one to be the second (B, for example). Next, the control unit 12 compares C and D with each other and sets the later one to be the third (D, for example) and then compares the dates and times of C and E with each other and sets the later one to be the fourth (C, for example). Next, for the residual E and F, E is later, and the control unit 12 sets the fifth to be E and sets the sixth to be F. When the dates and times compared with each other are the same, the control unit 12 performs sort such that the outgoing call is put on a higher priority than the incoming call or vice versa as a certain sorting rule.

There are circumstances that the mobile phone 2, when transferring the phonebook data, is required to transfer it with the data format of the phonebook data converted into a data format of "vCard" prescribed in the Bluetooth communication standard and the phonebook data in general has a lower frequency of data update than that of the outgoing call history data and the incoming call history data. Given these circumstances, the control unit 12 may first receive the outgoing call history data and the incoming call history data by the Bluetooth communication unit 13 from the mobile phone 2 and then receive the phonebook data by the Bluetooth communication unit 13 from the mobile phone 2. The control unit 12 may receive the outgoing call history data and the incoming call history data by the Bluetooth communication unit 13 from the mobile phone 2 and then receive the phonebook data by the Bluetooth communication unit 13 from the mobile phone 2 only when the user performs a certain operation on the operating unit 14.

About whether the phonebook data is transferred by such a user operation or it is automatically transferred, the user may select and set manual transfer or automatic transfer on the hands-free apparatus 1, and the transfer processing may be performed in accordance with this setting. With the setting by automatic transfer set to "not transfer," after the PBAP-based wireless connection, the user performs a manual transfer operation and can thereby transfer only the telephoned directory data. When the HFP-based communication connection and the PBAP-based communication connection are serially connected, this manual transfer operation disconnects the HFP-based wireless communication connection, the PBAP-based wireless communication connection is performed, and when the data transfer ends, the HFP-based wireless communication is again connected to the mobile phone 2 to enable a hands-free telephone conversation.

When this "not transfer" is set, the outgoing call history data and the incoming call history data, which have a higher frequency of data update, can be received with higher priority than the phonebook data, which has a lower frequency of data update, and owing to the circumstances that although data conversion is not required to transfer the outgoing call history data and the incoming call history data, data conversion is required to transfer the phonebook data, the outgoing call history data and the incoming call history data, which have a shorter transfer time, can be received with higher priority than the phonebook data, which has a longer transfer time. Only the outgoing call history data and the incoming call history data are transferred, whereby a data amount to be transferred can be reduced. Consequently, transfer protocol-based communication can be performed early, and subsequent hands-free protocol-based communication can be performed early, and thus when the mobile phone is carried into the vehicle, a time until a hands-free telephone conversation is performed can be reduced. Further, whether the phonebook data, which has a lower frequency of data update and a longer transfer time, is received can be selected as needed, which can improve convenience.

When the phonebook data is transferred as needed by the manual transfer operation by the user, upon ending transfer, the hands-free protocol-based communication is automatically executed, and thus when an outgoing call is made using the phonebook data, a hands-free telephone conversation can be held, which improves convenience. Further, when transfer of the phonebook data by the manual transfer operation is performed, only the phonebook data may be stored in the non-volatile storage memory 17, and the stored data may be read from the storage memory 17 at the time of the next start-up of the hands-free apparatus 1 and be used as the phonebook data.

The control unit 12 may cause the working memory 16 to store therein the outgoing call history data, the incoming call history data, and the phonebook data received from the mobile phone 2 in a distinguished manner for each mobile phone 2. In this case, the control unit 12 associates the mobile phone 2 and the data stored in the working memory 16 with each other as follows, for example. That is to say, when the outgoing call history data, the incoming call history data, and the phonebook data received from the mobile phone 2 are stored in the working memory 16, a link key is generated based on a mobile phone ID individually imparted to the mobile phone 2 received from the mobile phone 2 and an apparatus ID individually imparted to the hands-free apparatus 1, and the generated link key is stored in the working memory 16 in association with the various kinds of data. When receiving the mobile phone ID from the mobile phone 2 from that point on, the control unit 12 again generates the link key based on the received mobile phone ID and apparatus ID and updates the various kinds of data stored in the working memory 16 in association with the generated link key.

Figure 19:
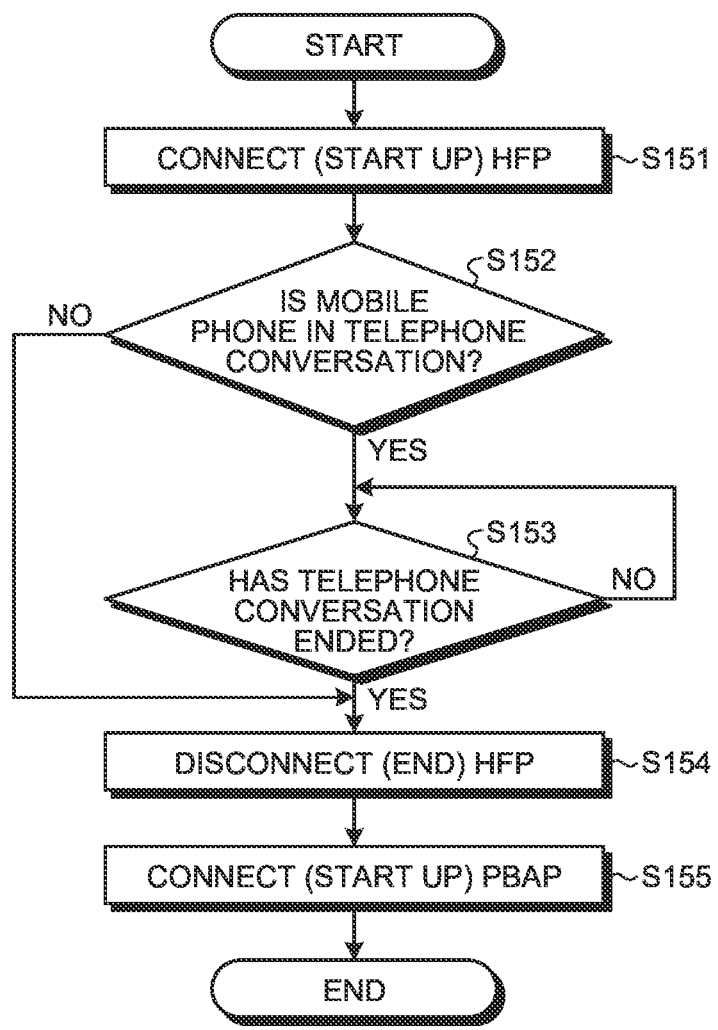
FIG. 19 is a flowchart of details of a procedure of HFP processing according to the first embodiment.

The following describes the HFP processing at S2 in the flowchart in FIG. 4 described above in detail. FIG. 19 is a flowchart of details of a procedure of the HFP processing according to the present embodiment. FIG. 19 illustrates an example in which HFP and PBAP are serially connected; they may simultaneously be connected (connected in a multi-profile manner).

If the hands-free telephone conversation connection unit 102 determines that a communication line has been established with the mobile phone 2 present within the Bluetooth communication range, the hands-free telephone conversation connection unit 102 connects (starts up) the HFP-based wireless communication connection (S151) and determines whether the mobile phone 2 is in a telephone conversation (S152). Whether the mobile phone 2 is in a telephone conversation or on standby is notified by the HFP-based wireless communication, is received by the hands-free apparatus 1, and is determined by the received communication state. S151 corresponds to the processing at S2.

If the hands-free telephone conversation connection unit 102 determines that the mobile phone 2 is not in a telephone conversation, that is, has been on standby waiting for an incoming call (No at S152), the hands-free telephone conversation connection unit 102 disconnects (ends) the connected HFP-based wireless communication (S154), and the data transfer control unit 103 connects the PBAP-based wireless communication (S155). That is to say, if the mobile phone 2 is not in a telephone conversation, the hands-free telephone conversation connection unit 102 quickly automatically disconnects the connected HFP-based wireless communication and automatically connects the PBAP-based wireless communication to cause the Bluetooth communication unit 13 to receive the outgoing call history data, the incoming call history data, and the phonebook data transmitted from the mobile phone 2.

If the hands-free telephone conversation connection unit 102 determines that the mobile phone 2 is in a telephone conversation (Yes at S152), the hands-free telephone conversation connection unit 102 maintains the HFP-based wireless communication in consideration of the possibility that the telephone conversation is executed as a hands-free telephone conversation using the hands-free apparatus 1. Whether this telephone conversation is executed basically depends on the mobile phone 2; when the HFP-based wireless communication connection is established while the mobile phone 2 is in a telephone conversation, the mobile phone 2 may automatically transmit received voices to the Bluetooth communication unit 13, whereas an operation on the mobile phone 2 may transmit the received voices to the Bluetooth communication unit 13.

The hands-free telephone conversation connection unit 102 determines whether the mobile phone 2 has ended the telephone conversation (S153) and, if determined that the mobile phone 2 has ended the telephone conversation (Yes at S153), disconnects (ends) the connected HFP-based wireless communication (No at S154), and the data transfer control unit 103 connects the PBAP-based wireless communication (S155). That is to say, when the mobile phone 2 is in a telephone conversation, the hands-free telephone conversation connection unit 102 disconnects the connected HFP-based wireless communication after the telephone conversation has ended and connects the PBAP-based wireless communication to cause the Bluetooth communication unit 13 to receive the outgoing call history data, the incoming call history data, and the phonebook data transmitted from the mobile phone 2 after the user has ended the hands-free telephone conversation.

When the mobile phone 2 is thus connected to the hands-free apparatus 1, the hands-free apparatus 1 determines whether the mobile phone 2 is in a telephone conversation and, if the mobile phone 2 is in a telephone conversation, shifting to a hands-free telephone conversation becomes impossible if switched to the PBAP-based wireless communication connection, and thus the HFP-based wireless communication is maintained, and the PBAP-based wireless communication connection is not performed during a telephone conversation. Upon determining the end of the telephone conversation, the HFP-based wireless communication is disconnected, and the PBAP-based wireless communication connection is performed. Consequently, when the mobile phone 2 is in a single telephone conversation, switching to a hands-free telephone conversation can be smoothly performed.

The control unit 12 may receive a responded incoming call history and a non-responded incoming call (missed call) history as the incoming call history data from the mobile phone 2 and store these therein in a distinguished manner. FIG. 20 is a diagram of another exemplary transition of display screens when the user performs an outgoing call operation from the incoming call history according to the present embodiment. If the control unit 12 determines that the user has performed the incoming call history-based outgoing call operation by pressing the "history button" 4*a* and then pressing the "incoming call history button" 4*c*, the control unit 12 refers to the incoming call history data stored in the working memory 16, refers to the phonebook data stored in the working memory 16, and causes the display unit 15 to display the incoming call history-based outgoing call operation screen as illustrated at (b) and (c) in FIG. 20; either an icon figure representing that it is a responded incoming call (a figure as a combination of a handset and an arrow) or an icon figure representing that it is a non-responded incoming call (missed call) (a figure as a combination of a handset and a x mark) is displayed for each data.

The present embodiment describes a case in which the working memory 16 stores therein the outgoing call history data, the incoming call history data, and the phonebook data transferred from the mobile phone 2 and a case in which the storage memory 17 stores therein the phonebook data; the storage memory 17 may store therein the outgoing call history data, the incoming call history data, and the phonebook data transferred from the mobile phone 2. In this configuration, even when the power of the hands-free apparatus 1 is turned off, the outgoing call history data, the incoming call history data, and the phonebook data stored in the storage memory 17 are held.

In FIGS. 15, 16, 17, and 20, the "synchronization button" 4f is omitted; the "synchronization button" 4f may be displayed also in the situations corresponding to these drawings.

Thus, the hands-free apparatus 1 of the present embodiment, before receiving the history data or the phonebook data from the mobile phone 2, executes the synchronization permission checking processing to check whether the transfer of the history data or the phonebook data has been permitted in the mobile phone 2. Thus, the hands-free apparatus 1 of the present embodiment enables an appropriate action according to a data synchronization state between the hands-free apparatus 1 and the mobile phone 2.

The hands-free apparatus 1 of the present embodiment executes the first processing when the synchronization processing to transfer the history data and the phonebook data from the mobile phone 2 has not succeeded. In the present embodiment, the first processing includes reporting that there is a possibility that the synchronization processing to transfer the history data and the phonebook data is not permitted in the mobile phone 2. Thus, the hands-free apparatus 1 of the present embodiment enables the user to easily grasp the data synchronization state between the hands-free apparatus 1 and the mobile phone 2.

More specifically, when the transfer of the history data and the phonebook data from the mobile phone 2 to the hands-free apparatus 1 cannot be performed, the user can grasp based on the reporting that the cause of the prohibition of the data transfer is that there is a possibility that the synchronization processing to transfer the history data and the phonebook data is not permitted in the mobile phone 2. Thus, the hands-free apparatus 1 of the present embodiment can reduce user confusion. The user can thus take a quick action such as checking and changing the setting of the mobile phone 2.

In the present embodiment, the first processing includes reporting that the operation to manually transfer the history data or the phonebook data by the user is unreceivable. Thus, the hands-free apparatus 1 of the present embodiment causes the user to grasp that manual transfer cannot be performed and can thus reduce performing an unnecessary operation such as pressing the manual transfer button many times in the hands-free apparatus 1 by the user even though the synchronization processing to transfer the history data or the phonebook data has not been permitted in the mobile phone 2.

The hands-free apparatus 1 of the present embodiment maintains the hands-free telephone conversation-enabled connection with the mobile phone 2 even when the synchronization processing to transfer the history data and the phonebook data from the mobile phone 2 has not succeeded. Thus, the hands-free apparatus 1 of the present embodiment enables the user to hold an HFP-based hands-free telephone conversation even without acquiring the history data and the phonebook data from the mobile phone 2.

In the present embodiment, the hands-free apparatus 1 connects to the mobile phone 2 based on HFP and PBAP; another communication protocol may be employed. The hands-free apparatus 1 and the mobile phone 2 may be connected to each other through a wireless communication standard other than Bluetooth.

In the present embodiment, the hands-free telephone conversation connection unit 102 and the hands-free telephone conversation execution unit 104 are described as different functional units; the hands-free telephone conversation connection unit 102 may include the function of the hands-free telephone conversation execution unit 104.

In the present embodiment, when the PBAP connection has failed, the data transfer control unit 103 starts the PBAP connection again when the "synchronization button" 4f is pressed; regardless of the presence or absence of the pressing of the "synchronization button" 4f, the PBAP connection may be retried for a certain period or up to a certain number of times.

Second Embodiment

In this second embodiment, when the data transfer has been permitted in the mobile phone 2 after the PBAP connection has once failed because of the permission setting for the data transfer not being done in the mobile phone 2, the hands-free apparatus 1 reports that the permission setting has been changed.

A hardware configuration and a functional configuration of the hands-free apparatus 1 of the present embodiment are similar to those of the first embodiment described in FIGS. 2 and 3, respectively.

The hands-free apparatus 1 of the present embodiment executes second processing when the synchronization processing to transfer the history data or the phonebook data has been permitted in the mobile phone 2 after executing the first processing.

In the present embodiment, the second processing includes reporting that the synchronization processing has been permitted. The display control unit 105 of the present embodiment, in addition to including the function of the first embodiment, displays that the synchronization processing has been permitted or that the data transfer has become enabled on the display unit 15, for example.

The second processing may include performing displaying to allow a user to select whether to start the synchronization processing. The display control unit 105 of the present embodiment displays a selection screen allowing the user to select whether to start the synchronization processing on the display unit 15, for example.

The second processing may include reporting that the operation to manually transfer the history data or the phonebook data by the user has become receivable. The display control unit 105 of the present embodiment changes the display mode of the operating button for receiving the operation of manual transfer by the user or changes the operating button from a hidden state to a displayed state to execute the reporting, for example. The display control unit 105 changes the manual transfer button that has been displayed in an inactive manner to be displayed in an active manner, for example.

The method of reporting is not limited thereto. The hands-free apparatus 1 may further include a voice control unit (not illustrated) and output a voice message indicating reporting contents from the speaker 19, for example.

The hands-free apparatus 1 may execute all the pieces of processing included in the second processing described above or execute only part of them.

When the data transfer has been permitted in the mobile phone 2 after the PBAP connection has once failed because of the permission setting for the data transfer not being done in the mobile phone 2, the data transfer control unit 103, when automatic transfer of the history data or the phonebook data has been set in the hands-free apparatus 1 or the mobile phone 2, automatically executes the processing to transfer the history data or the phonebook data based on PBAP.

Thus, the hands-free apparatus 1 of the present embodiment, when the synchronization processing to transfer the history data or the phonebook data has been permitted in the mobile phone 2 after executing the first processing, displays that the synchronization processing has been permitted or that the data transfer has become enabled on the display unit 15. Thus, the hands-free apparatus 1 of the present embodiment enables the user of the hands-free apparatus 1 to easily grasp that that the data transfer has become enabled. When another user positioned at a rear seat or a passenger seat of the vehicle 3 performs a permission setting operation of the mobile phone 2, for example, the user of the hands-free apparatus 1 positioned at a driver's seat sees the display unit 15 and can thereby grasp that the data transfer has become enabled. Even if the user himself/herself of the hands-free apparatus 1 performs the permission setting operation of the mobile phone 2, the user can grasp that the data transfer has become enabled by changing the setting of the mobile phone 2 before the data transfer of the history data or the phonebook data is actually completed, and thus, user convenience can be improved.

The hands-free apparatus 1 of the present embodiment, when the synchronization processing to transfer the history data or the phonebook data has been permitted in the mobile phone 2 after executing the first processing, displays the selection screen allowing the user to select whether to start the synchronization processing. Thus, the hands-free apparatus 1 of the present embodiment enables the user to grasp that the data transfer has become enabled and to execute the data transfer at any timing.

The hands-free apparatus 1 of the present embodiment, when the synchronization processing to transfer the history data or the phonebook data has been permitted in the mobile phone 2 after executing the first processing, changes the display mode of the operating button for receiving the operation of manual transfer by the user or changes the operating button from a hidden state to a displayed state. Thus, the hands-free apparatus 1 of the present embodiment enables the user to easily grasp that the manual transfer of the history data or the phonebook data has become enabled.

Third Embodiment

In this third embodiment, the hands-free apparatus 1, when the synchronization processing to transfer the history data and the phonebook data from the mobile phone 2 has not succeeded, disconnects the connection with the mobile phone 2.

Figure 21:
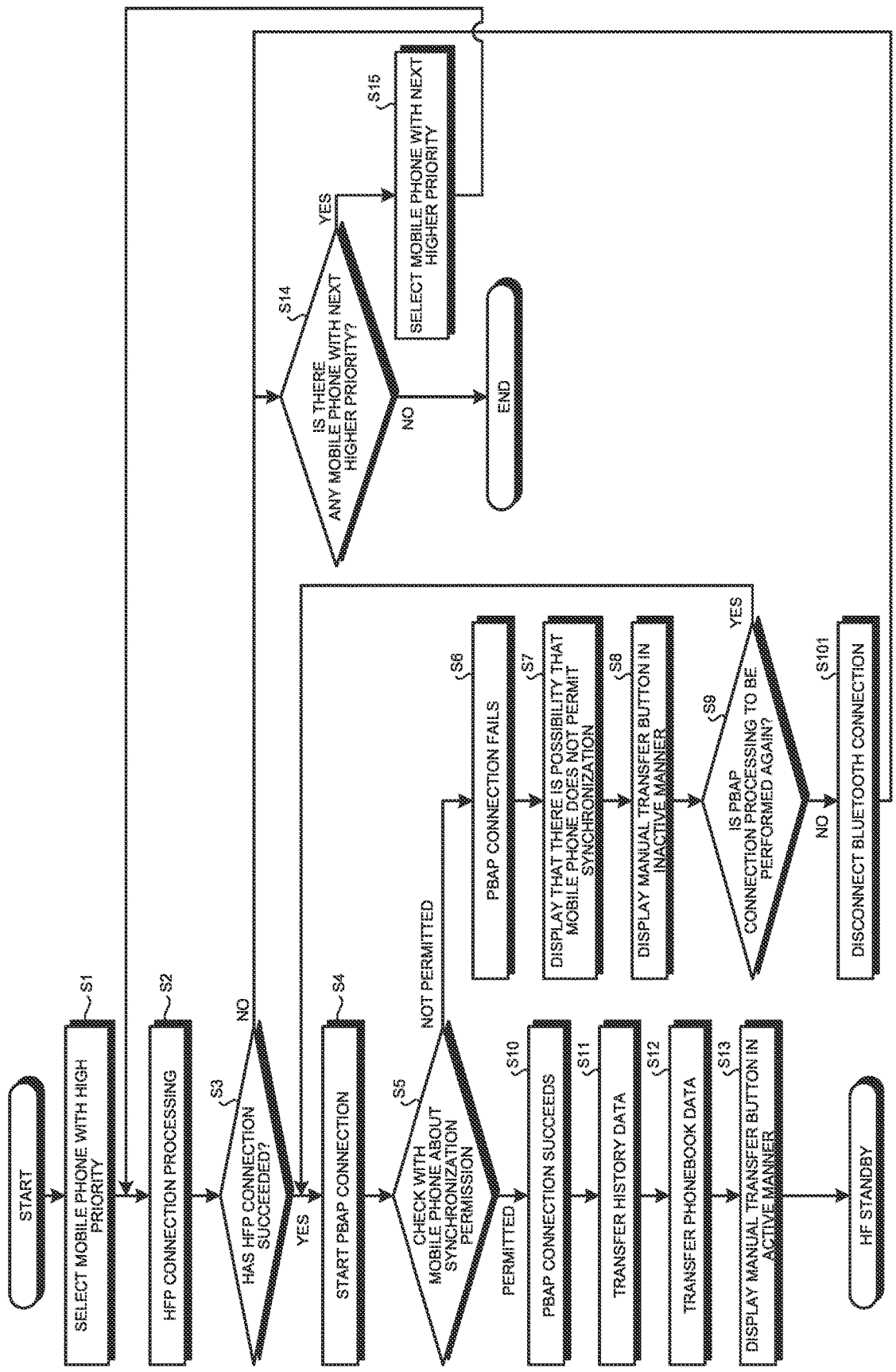
FIG. 21 is a diagram of an exemplary procedure of data transfer processing according to a third embodiment.

FIG. 21 is a diagram of an exemplary procedure of data transfer processing according to the present embodiment. The processing from S1 to S9 is similar to the processing of the first embodiment described in FIG. 4.

In the present embodiment, the data transfer control unit 103, if determining, in the processing to determine whether the instruction to again perform the PBAP connection processing has been input by the user at S9, that the instruction to perform the PBAP connection processing again has not been input (No at S9), disconnects the Bluetooth connection with the mobile phone 2 (S101). In this case, the HFP connection between the hands-free apparatus 1 and the mobile phone 2 is also disconnected, and thus outgoing calls and incoming calls made and received by the mobile phone 2 cannot be made hands-free telephone conversations.

In this case, the hands-free telephone conversation connection unit 102 advances to the processing at S14 and determines whether there is any mobile phone 2 with next higher priority. The subsequent processing is similar to the processing of the first embodiment described in FIG. 4.

Thus, the hands-free apparatus 1 of the present embodiment, when the synchronization processing to transfer the history data and the phonebook data from the mobile phone 2 has not succeeded, disconnects the connection with the mobile phone 2. Thus, the hands-free apparatus 1 of the present embodiment, when determining that the user does not desire synchronization of the history data and the phonebook data, can quickly cancel the connection with the mobile phone 2.

A computer program executed by the hands-free apparatus 1 of the embodiments described above is embedded and provided in a ROM, for example. The computer program executed by the hands-free apparatus 1 of the embodiments described above may be recorded and provided in a computer-readable recording medium such as a compact disc read only memory (CD-ROM), a flexible disk (FD), a compact disc recordable (CD-R), or a digital versatile disc (DVD) as an installable or executable file.

The computer program executed by the hands-free apparatus 1 of the embodiments described above may be stored in a computer connected to a network such as the Internet and provided by being downloaded via the network. The computer program executed by the hands-free apparatus 1 of the embodiments described above may be provided or distributed via a network such as the Internet.

First Modification

In the embodiments described above, the hands-free apparatus 1 is installed in the vehicle 3; the hands-free apparatus 1 is not limited to an on-vehicle apparatus. The hands-free apparatus 1 may be able to be used when the user holds a telephone conversation in a hands-free manner outside the vehicle 3, for example.

Second Modification

In the embodiments described above, the hands-free apparatus 1 is implemented as one function of the on-vehicle navigation apparatus installed in the vehicle 3; the configuration is not limited thereto. The hands-free apparatus 1 may be formed by an exclusive hands-free apparatus mainly implementing a hands-free function or may be an apparatus installing a hands-free function in an on-vehicle audio apparatus reproducing compact discs (CDs) or radio. The hands-free apparatus 1 may have portability (be of a portable type).

Third Modification

In the embodiments described above, the reception unit 101, the hands-free telephone conversation connection unit 102, the data transfer control unit 103, the hands-free telephone conversation execution unit 104, and the display control unit 105 are implemented by reading the computer program from the storage memory 17 and executing it by the control unit 12; these functions may be implemented by a hardware circuit.

Other Modifications

The hands-free apparatus 1 may store the outgoing call history data, the incoming call history data, and the phonebook data received from the mobile phone 2 in the storage memory 17 and, each time the outgoing call history data, the incoming call history data, and the phonebook data are received from the mobile phone 2 from the mobile phone 2, store the outgoing call history data, the incoming call history data, and the phonebook data received from the mobile phone 2 in an updated manner. The outgoing call history data, the incoming call history data, and the phonebook data received from the mobile phone 2 received from the mobile phone 2 may be stored in both the working memory 16 and the storage memory 17 with the storage memory 17 used as a backup memory.

The number of the outgoing call history data or the incoming call history data that can be stored in the working memory 16 may be one. In this case, when the outgoing call processing or the incoming call processing by the hands-free apparatus 1 occurs, the outgoing call history data or the incoming call history data received by the PBAP-based wireless communication connection is necessarily deleted.

The hands-free apparatus 1 simultaneously displays a plurality of outgoing call history data and a plurality of incoming call history data; they may be displayed one by one. In this case, first, the latest data may be displayed, and then the second latest data may be successively displayed by an operation on the operating unit 14, for example.

The hands-free apparatus according to the present disclosure can facilitate grasping of the data synchronization state between the hands-free apparatus and the mobile phone.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A hands-free apparatus on a vehicle, the hands-free apparatus comprising:
   a memory; and
   a hardware processor coupled to the memory, the memory storing a program that, when executed by the hardware processor, causes the hands-free device to:
      connect to a mobile phone to enable a hands-free telephone conversation by using a hands-free communication protocol for making a hands-free call;
      establish a connection with the mobile phone using a data transfer protocol, the data transfer protocol being based on Phone Book Access Profile (PBAP) and for transferring phone data about a phone to receive the phone data transferred from the mobile phone, and to receive at least one data of outgoing call history data, incoming call history data, missed call history data, and phonebook data stored in the mobile phone;
      execute synchronization permission checking processing to check whether transfer of the at least one data from the mobile phone to an other device is permitted in the mobile phone before receiving the at least one data from the mobile phone;
      when the transfer of the at least one data is permitted in the mobile phone, receive the at least one data from the mobile phone by using the data transfer protocol; and
      when the transfer of the at least one data is not permitted in the mobile phone, execute first processing, the first processing including reporting to a user on the vehicle, that the transfer of the at least one data is not permitted.

2. The hands-free apparatus according to claim 1, wherein the program, when executed by the hardware processor, causes the hands-free device to cause a display to display that there is a possibility that the synchronization processing to transfer the at least one data is not permitted in the mobile phone, to execute the reporting.

3. The hands-free apparatus according to claim 1, wherein the first processing includes reporting that an operation to manually transfer the at least one data by a user is unreceivable, and
   the program, when executed by the hardware processor, causes the hands-free device to change a display mode of an operating button for receiving the operation of manual transfer by the user or hide the operating button to execute the reporting.

4. The hands-free apparatus according to claim 2, wherein the program, when executed by the hardware processor, causes the hands-free device to execute second processing when the synchronization processing to transfer the at least one data has been permitted in the mobile phone after executing the first processing.

5. The hands-free apparatus according to claim 3, wherein the program, when executed by the hardware processor, causes the hands-free device to execute second processing when the synchronization processing to transfer the at least one data has been permitted in the mobile phone after executing the first processing.

6. The hands-free apparatus according to claim 4, wherein the second processing includes reporting that the synchronization processing has been permitted, and
   the program, when executed by the hardware processor, causes the hands-free device to display, on a display, that the synchronization processing has been permitted or that data transfer has become enabled.

7. The hands-free apparatus according to claim 5, wherein the second processing includes reporting that the synchronization processing has been permitted, and
   the program, when executed by the hardware processor, causes the hands-free device to display, on a display, that the synchronization processing has been permitted or that data transfer has become enabled.

8. The hands-free apparatus according to claim 4, wherein the second processing includes displaying to allow a user to select whether to start the synchronization processing, and
   the program, when executed by the hardware processor, causes the hands-free device to display, on the display, a selection screen allowing the user to select whether to start the synchronization processing.

9. The hands-free apparatus according to claim 5, wherein the second processing includes displaying to allow the user to select whether to start the synchronization processing, and
   the program, when executed by the hardware processor, causes the hands-free device to display, on a display, a selection screen allowing the user to select whether to start the synchronization processing.

10. The hands-free apparatus according to 4, wherein the second processing includes reporting that the operation to manually transfer the at least one data by the user has become receivable, and
    the program, when executed by the hardware processor to change a display mode of a operating button for receiving an operation of manual transfer by the user or changes the operating button from a hidden state to a displayed state to execute the reporting.

11. The hands-free apparatus according to 5, wherein the second processing includes reporting that the operation to manually transfer the at least one data by the user has become receivable, and
    the program, when executed by the hardware processor, causes the hands-free device to change the display mode of the operating button for receiving the operation of manual transfer by the user or changes the operating button from a hidden state to a displayed state to execute the reporting.

12. The hands-free apparatus according to claim 1, wherein the first processing includes disconnecting connection with the mobile phone.

13. The hands-free apparatus according to claim 1, wherein the program, when executed by the hardware processor, causes the hands-free device to maintain hands-free telephone conversation-enabled connection with the mobile phone even when synchronization processing to transfer the at least one data from the mobile phone has not succeeded.

14. A method for transferring data, the method being executed by a computer on a vehicle, the method comprising:
    connecting to a mobile phone to enable a hands-free telephone conversation by using a hands-free communication protocol for making a hands-free call;
    establishing a connection with the mobile phone using a data transfer protocol, the data transfer protocol being based on Phone Book Access Profile (PBAP), for transferring phone data about a phone to receive the phone data transferred from the mobile phone, and for receiving at least one data of outgoing call history data, incoming call history data, missed call history data, and phonebook data stored in the mobile phone;
    executing synchronization permission checking processing to check whether transfer of the at least one data from the mobile phone to an other device is permitted in the mobile phone before receiving the at least one data from the mobile phone;
    when the transfer of the at least one data is permitted in the mobile phone, receiving the at least one data from the mobile phone by using the data transfer protocol; and
    when the transfer of the at least one data is not permitted in the mobile phone, executing first processing, the first processing including reporting to a user on the vehicle, that the transfer of the at least one data is not permitted.

15. A non-transitory computer readable medium including programmed instructions that cause a computer on a vehicle to perform:
    connecting to a mobile phone to enable a hands-free telephone conversation by using a hands-free communication protocol for making a hands-free call;
    establishing a connection with the mobile phone using a data transfer protocol, being based on PBAP (Phone Book Access Profile), for transferring phone data about a phone to receive the phone data transferred from the mobile phone, and for receiving at least one data of outgoing call history data, incoming call history data, missed call history data, and phonebook data stored in the mobile phone;
    executing synchronization permission checking processing to check whether transfer of the at least one data from the mobile phone to an other device is permitted in the mobile phone before receiving the at least one data from the mobile phone;
    when the transfer of the at least one data is permitted in the mobile phone, receiving the at least one data from the mobile phone by using the data transfer protocol; and
    when the transfer of the at least one data is not permitted in the mobile phone, executing first processing, the first processing including reporting to a user on the vehicle, that the transfer of the at least one data is not permitted.

* * * * *